(12) United States Patent
Beser

(10) Patent No.: US 7,782,832 B2
(45) Date of Patent: *Aug. 24, 2010

(54) USE OF GROUP POLL SCHEDULING FOR BROADBAND COMMUNICATION SYSTEMS

(75) Inventor: Nurettin Burcak Beser, Sunnyvale, CA (US)

(73) Assignee: Juniper Networks, Inc., Sunnyvale, CA (US)

( * ) Notice: Subject to any disclaimer, the term of this patent is extended or adjusted under 35 U.S.C. 154(b) by 344 days.

This patent is subject to a terminal disclaimer.

(21) Appl. No.: 11/756,900

(22) Filed: Jun. 1, 2007

(65) Prior Publication Data

US 2007/0280291 A1 Dec. 6, 2007

Related U.S. Application Data

(63) Continuation of application No. 10/096,074, filed on Mar. 11, 2002, now Pat. No. 7,242,694.

(60) Provisional application No. 60/334,727, filed on Oct. 31, 2001.

(51) Int. Cl.
*H04B 7/212* (2006.01)

(52) U.S. Cl. ..................................... 370/347

(58) Field of Classification Search .................. None
See application file for complete search history.

(56) References Cited

U.S. PATENT DOCUMENTS

| 6,654,957 | B1 | 11/2003 | Moore et al. ............... 725/111 |
| 6,801,537 | B1 | 10/2004 | Kubbar ....................... 370/442 |
| 6,956,865 | B1 | 10/2005 | Khaunte et al. ............. 370/442 |
| 6,963,541 | B1 | 11/2005 | Vogel et al. ................. 370/252 |
| 7,206,321 | B1 * | 4/2007 | Bansal et al. ............... 370/461 |
| 2002/0036985 | A1 | 3/2002 | Jonas et al. ................. 370/235 |
| 2002/0061012 | A1 | 5/2002 | Thi et al. .................... 370/352 |
| 2002/0101883 | A1 * | 8/2002 | Ruszczyk et al. ........... 370/503 |
| 2003/0012223 | A1 | 1/2003 | Chappell et al. ............ 370/468 |

* cited by examiner

*Primary Examiner*—Raj Jain
(74) *Attorney, Agent, or Firm*—Harrity & Harrity, LLP

(57) ABSTRACT

A group poll mechanism (GPM) that schedules upstream bandwidth for cable modems by pointing a request opportunity normally reserved for a single service flow to more than one service flow. Essentially, instead of using the seldom-used poll requests one per service flow, this same request opportunity is pointed to multiple service flows. In such kind of a scheme the GPM gives the same mini-slot to multiple service flows. The GPM implements the use of place-holder SIDs and novel mapping of information elements in MAP messages.

19 Claims, 16 Drawing Sheets

| SERVICE FLOW PARAMETER | BEST EFFORT | NON-REAL-TIME POLLING | REAL-TIME POLLING | UNSOLICITED GRANT | UNSOLICITED GRANT WITH ACTIVITY DET. |
|---|---|---|---|---|---|
| MISCELLANEOUS | | | | | |
| • TRAFFIC PRIORITY | OPTIONAL DEFAULT = 0 | OPTIONAL DEFAULT = 0 | N/A* | N/A | N/A |
| • MAX CONCATENATED BURST | OPTIONAL | OPTIONAL | OPTIONAL | N/A | N/A |
| • UPSTREAM SCHEDULING SERVICE TYPE | OPTIONAL DEFAULT = 2 | MANDATORY | MANDATORY | MANDATORY | MANDATORY |
| • REQUEST/TRANSMISSION POLICY | OPTIONAL DEFAULT = 0 | MANDATORY | MANDATORY | MANDATORY | MANDATORY |
| MAXIMUM RATE | | | | | |
| • MAX SUSTAINED TRAFFIC RATE | OPTIONAL DEFAULT = 0 | OPTIONAL DEFAULT = 0 | OPTIONAL DEFAULT = 0 | N/A | N/A |
| • MAX TRAFFIC BURST | OPTIONAL DFLT = 1522 | OPTIONAL DFLT = 1522 | OPTIONAL DFLT = 1522 | N/A | N/A |
| MINIMUM RATE | | | | | |
| • MIN RESERVED TRAFFIC RATE | OPTIONAL DEFAULT = 0 | OPTIONAL DEFAULT = 0 | OPTIONAL DEFAULT = 0 | N/A | N/A |
| • ASSUMED MINIMUM...PACKET SIZE | OPTIONAL* | OPTIONAL* | OPTIONAL* | OPTIONAL* | OPTIONAL* |
| GRANTS | | | | | |
| • UNSOLICITED GRANT SIZE | N/A | N/A | N/A | MANDATORY | MANDATORY |
| • GRANTS PER INTERVAL | N/A | N/A | N/A | MANDATORY | MANDATORY |
| • NOMINAL GRANT INTERVAL | N/A | N/A | N/A | MANDATORY | MANDATORY |
| • TOLERATED GRANT JITTER | N/A | N/A | N/A | MANDATORY | MANDATORY |
| POLLS | | | | | |
| • NOMINAL POLLING INTERVAL | N/A | OPTIONAL* | MANDATORY | N/A | OPTIONAL[b] |
| • TOLERATED POLL JITTER | N/A | N/A | OPTIONAL* | N/A | OPTIONAL* |

USE OF GROUP POLL SCHEDULING FOR BROADBAND COMMUNICATION SYSTEMS

RELATED APPLICATIONS

This application is a continuation of U.S. patent application Ser. No. 10/096,074 filed Mar. 11, 2002, which also claims priority from an earlier-filed provisional patent application No. 60/334,727, entitled "Context Dependent Scheduling" filed Oct. 31, 2001, both of which are hereby incorporated by reference.

FIELD OF THE INVENTION

The present invention relates to broadband communications systems. More particularly, the present invention is directed to a upstream channel scheduling in broadband systems such as cable modem systems.

BACKGROUND

Recently, there has been an explosive demand for services, such as data, voice, and video, to be delivered over broadband communications systems. So-called cable modem technology is one of the most popular methods of providing such broadband services to subscribers. Cable modem technology competes with technologies such as Asymmetric Digital Subscriber Lines (ADSL) and ISDN (Integrated Services Digital Network). Many in the industry forecast that cable modem systems will be the prevailing technology for providing broadband services since cable television is already widely in use.

FIG. 1 illustrates a simplified diagram of a conventional cable modem system. The DOCSIS (Data Over Cable Service Interface Specifications) Radio Frequency Interface Specification specifies the transfer of IP traffic, between the cable headend system and customer locations, over an all-coaxial or a hybrid-fiber/coax (HFC) cable network 52. The transmission path over the cable system is realized at the headend by a Cable Modem Termination System (CMTS) 50, and at each customer location by a Cable Modem (CM) 56. The DOCSIS standard defines a single transmitter for each downstream channel—the CMTS 50. All CMs 56 listen to all frames transmitted on the downstream channel upon which they are registered and accept those where the destinations match the CM 56 itself or CPEs (Customer Premises Equipment) 58 connected. CMs 56 can communicate with other CMs 56 only through the CMTS 50.

The upstream channel is characterized by many transmitters (i.e. CMs 56) and one receiver (i.e. the CMTS 50). Time in the upstream channel is slotted, providing for TDMA at regulated time ticks. The CMTS 50 provides the time reference and controls the allowed usage for each interval. Intervals may be granted for transmissions by particular CMs 56, or for contention by all CMs 56. CMs 56 may contend to request transmission time. To a limited extent, CMs 56 may also contend to transmit actual data. In both cases, collisions can occur and retries are used.

The upstream Physical Media Dependent (PMD) sublayer uses a Frequency Division Multiple Access (FDMA)/TDMA burst modulation format, which provides five symbol rates and two modulation formats (Quadrature Phase Shift Keying (QPSK) and 16-QAM (Quadrature Amplitude Modulation)). The modulation format includes pulse shaping for spectral efficiency, is carrier-frequency agile, and has selectable output power level. The PMD sublayer format includes a variable-length modulated burst with precise timing beginning at boundaries spaced at integer multiples of 6.25 microseconds apart (which is 16 symbols at the highest data rate). Each burst supports a flexible modulation, symbol rate, preamble, randomization of the payload, and programmable FEC (Forward Error Correction) encoding. All of the upstream transmission parameters associated with burst transmission outputs from the CM 56 are configurable by the CMTS 50 via MAC (Media Access Controller) messaging.

The concept of Service Flows is central to the operation of the DOCSIS upstream transmission. Service Flows provide a mechanism for upstream Quality of Service management. In particular, they are integral to bandwidth allocation. A Service Flow ID defines a particular unidirectional mapping between a cable modem and the CMTS. Active upstream Service Flow IDs also have associated Service IDs or SIDs. Upstream bandwidth is allocated to SIDs, and hence to cable modems, by the CMTS upstream scheduler. SIDs provide the mechanism by which upstream Quality of Service is implemented.

In a basic cable modem implementation, two Service Flows (one upstream, one downstream) could be used, for example, to offer best-efforts IP (Internet Protocol) service. However, the Service Flow concept allows for more complex cable modems to be developed which support for multiple service classes while supporting interoperability with more basic modems. With these more complex cable modems, it is possible that certain Service Flows will be configured in such a way that they cannot carry all types of traffic. That is, they may have a maximum packet size limitation or be restricted to small fixed size unsolicited grants. Furthermore it might not be appropriate to send other kinds of data on Service Flows that are being used for Constant Bit Rate (CBR)-type applications.

Even in these complex modems, it is necessary to be able to send certain upstream packets needed for MAC management, SNMP management, key management, etc. For the network to function properly, all cable modems should support at least one upstream and one downstream Service Flow. All Service Flow IDs are unique within the upstream. The mapping of a unicast Service Identifier to an active/admitted Service Flow is unique within a single upstream. The length of the Service Flow ID is 32 bits. The length of the Service ID is 14 bits.

As shown in FIG. 2, the upstream transmission time-line is divided into intervals by the upstream bandwidth allocation mechanism. Each interval is an integral number of mini-slots. A "mini-slot" is the unit of granularity for upstream transmission opportunities. There is no implication that any PDU can actually be transmitted in a single mini-slot. Each interval is labeled with a usage code, which defines both the type of traffic that can be transmitted during that interval and the physical-layer modulation encoding. A mini-slot is a power-of-two multiple of 6.25 microseconds increments, i.e., 2, 4, 8, 16, 32, 64, or 128 times 6.25 microseconds. Since the upstream channel is modeled as a stream of mini-slots, the CMTS generates the time reference for identifying these slots. The CMTS also controls access to these slots by the cable modems. For example, it may grant some number of contiguous slots to a cable modem for it to transmit a data PDU. The cable modem times its transmission such that that the CMTS receives it in the time reference specified. The basic mechanism for assigning bandwidth management is the bandwidth allocation MAP.

The bandwidth allocation MAP is a MAC Management message transmitted by the CMTS on the downstream channel which describes, for some interval of time, the uses to which the upstream frequency will be used by a given CM. A given MAP may describe some time slots as grants for particular stations to transmit data in, other time slots as available for contention transmission, and other slots as an opportunity for new stations to join the link. FIG. 3 illustrates a MAC Header and MAC Management Message Header Fields.

The upstream bandwidth allocation MAP includes a fixed-length header followed by a variable number of information elements (IEs) as shown in FIG. 4. The upstream bandwidth allocation MAP message header contains the following information:

Upstream Channel ID: The identifier of the upstream channel to which this message refers.

UCD Count: Matches the value of the Configuration Change Count of the UCD which describes the burst parameters which apply to this map.

Number Elements: Number of information elements in the map.

Alloc Start Time: Effective start time from CMTS initialization (in mini-slots) for assignments within this map.

Ack Time: Latest time, from CMTS initialization, (mini-slots) processed in upstream. This time is used by the CMs for collision detection purposes.

Ranging Backoff Start: Initial back-off window for initial ranging contention, expressed as a power of two. Values range 0-15 (the highest order bits must be unused and set to 0).

Ranging Backoff End: Final back-off window for initial ranging contention, expressed as a power of two. Values range 0-15 (the highest order bits must be unused and set to 0).

The number of Transmit Opportunities associated with a particular Information Element (IE) in a MAP is dependent on the total size of the region as well as the allowable size of an individual transmission. As an example, assume a REQ IE defines a region of 12 mini-slots. If the UCD defines a REQ Burst Size that fits into a single mini-slot then there are 12 Transmit Opportunities associated with this REQ IE, i.e., one for each mini-slot. If the UCD defines a REQ that fits in two mini-slots, then there are six Transmit Opportunities and a REQ can start on every other mini-slot.

TABLE 1

The Interval Usage Codes

| Interval Usage Code | Information Element Name |
| --- | --- |
| 1 | Request |
| 2 | REQ/Data |
| 3 | Initial Maintenance |
| 4 | Station Maintenance |
| 5 | Short Data Grant |
| 6 | Long Data Grant |
| 7 | Null IE |
| 8 | Data Acknowledge |
| 9-14 | Reserved |
| 15 | Expanded IUC |

As another example, assume a REQ/Data IE that defines a 24 mini-slot region. If it is sent with an SID of 0x3FF4, then a CM can potentially start a transmit on every fourth mini-slot; so this IE contains a total of six Transmit Opportunities (TX OP). Similarly, a SID of 0x3FF6 implies four TX OPs; 0x3FF8 implies three TX OPs; and 0x3FFC implies two TX OPs.

For an Initial Maintenance IE, a CM starts its transmission in the first mini-slot of the region; therefore it has a single Transmit Opportunity. The remainder of the region is used to compensate for the round trip delays since the CM has not yet been ranged. Station Maintenance IEs, Short/Long Data Grant IEs and unicast Request IEs are unicast and thus are not typically associated with contention Transmit Opportunities. They represent a single dedicated, or reservation based, Transmit Opportunity.

Each IE consists of a 14-bit Service ID, a 4-bit type code, and a 14-bit starting. FIG. 5 illustrates the structure of a MAP IE. Since all stations will scan all IEs, it is critical that IEs be short and relatively fixed format. IEs within the MAP are strictly ordered by starting offset. For most purposes, the duration described by the IE is inferred by the difference between the IE's starting offset and that of the following IE. For this reason, a Null IE terminates the list.

Types of Information Elements (IEs)

Four types of Service IDs are defined:
1. 0x3FFF—broadcast, intended for all stations.
2. 0x2000-0x3FFE—multicast, purpose is defined administratively.
3. 0x0001-0x1FFF—unicast, intended for a particular CM or a particular service within that cable modem.
4. 0x0000—null address, addressed to no station.

All of the Information Elements defined are supported by cable modems. A CMTS uses any of these Information Elements when creating Bandwidth Allocation Maps.

The Request (REQ) IE

The Request IE provides an upstream interval in which requests can be made for bandwidth for upstream data transmission. The character of this IE changes depending on the class of Service ID. If broadcast, this is an invitation for all cable modems to contend for requests. If unicast, this is an invitation for a particular CM to request bandwidth.

A small number of Priority Request SIDs are defined in DOCSIS. These allow contention for Request IEs to be limited to service flows of a given Traffic Priority. The Request/Data IE provides an upstream interval in which requests for bandwidth or short data packets may be transmitted. This IE is distinguished from the Request IE in that it provides a means by which allocation algorithms may provide for "immediate" data contention under light loads, and a means by which this opportunity can be withdrawn as network loading increases.

Multicast Service IDs are used to specify maximum data length, as well as allowed random starting points within the interval. For example, a particular multicast ID may specify a maximum of 64-byte data packets, with transmit opportunities every fourth slot.

Short and Long Data Grant IEs

The Short and Long Data Grant IEs provide an opportunity for a cable modem to transmit one or more upstream PDUs. These IEs are issued either in response to a request from a station, or because of an administrative policy providing some amount of bandwidth to a particular station (see class-of-service discussion below). These IEs can also be used with an inferred length of zero mini slots (a zero length grant), to indicate that a request has been received and is pending (a Data Grant pending).

Short Data Grants are used with intervals less than or equal to the maximum burst size for this usage specified in the Upstream Channel Descriptor. If Short Data burst profiles are defined in the UCD, then all Long Data Grants are for a larger number of mini-slots than the maximum for Short Data. The distinction between Long and Short Data Grants may be exploited in physical-layer forward-error-correction coding; otherwise, it is not meaningful to the bandwidth allocation process.

If this IE is a Data Grant Pending (a zero length grant), it will follow the NULL IE. This allows cable modems to process all actual allocations first, before scanning the MAP for data grants pending and data acknowledgments.

Data Acknowledge IE

The Data Acknowledge IE acknowledges that a data PDU was received. The cable modem will have requested this acknowledgment within the data PDU (normally this would be done for PDUs transmitted within a contention interval in order to detect collisions). This IE will follow the NULL IE. This allows cable modems to process all actual interval allocations first, before scanning the Map for data grants pending and data acknowledgments.

Requests

Requests refer to the mechanism that cable modems use to indicate to the CMTS that it needs upstream bandwidth allocation. A transmission request may come as a stand-alone Request Frame transmission or it may come as a piggyback request in the EHDR of another Frame transmission.

The Request Frame may be transmitted during any of the following intervals:
  Request IE
  Request/Data IE
  Short Data Grant IE
  Long Data Grant IE A piggyback request may be contained in the following Extended Headers (EHs):
  Request EH element
  Upstream Privacy EH element
  Upstream Privacy EH element with Fragmentation The request will include:
  The Service ID making the request
  The number of mini-slots requested The number of mini-slots requested will be the total number that are desired by the cable modem at the time of the request (including any physical layer overhead), subject to UCD 2 and administrative limits. The cable modem will request a number of mini-slots corresponding to one complete frame, except in the case of fragmentation in Piggyback Mode.

The cable modem will have only one request outstanding at a time per Service ID. If the CMTS does not immediately respond with a Data Grant, the cable modem is able to unambiguously determine that its request is still pending because the CMTS will continue to issue a Data Grant Pending in every MAP for as long as a request is unsatisfied. In MAPs, the CMTS cannot make a data grant greater than 255 mini-slots to any assigned Service ID. This puts an upper bound on the grant size the cable modem has to support.

The allocation MAP transmitted in time to propagate across the physical cable and be received and handled by the receiving cable modems. As such, it may be transmitted considerably earlier than its effective time. The components of the delay are:
  Worst-case round-trip propagation delay—may be network-specific, but on the order of hundreds of microseconds;
  Queuing delays within the CMTS—implementation-specific;
  Processing delays within the CMs will allow a minimum processing time by each cable modem; and
  PMD-layer FEC interleaving.

Within these constraints, vendors may wish to minimize this delay so as to minimize latency of access to the upstream channel. The number of mini-slots described vary from MAP to MAP. At a minimum, a MAP describes a single mini-slot. This would be wasteful in both downstream bandwidth and in processing time within the cable modems. At maximum, a MAP may stretch to tens of milliseconds. Such a MAP would provide poor upstream latency.

Allocation algorithms vary the size of the MAPs over time to provide a balance of network utilization and latency under varying traffic loads. A MAP would contain at least two Information Elements: one to describe an interval and a null IE to terminate the list. At the most, a MAP is bounded by a limit of 240 information elements. Maps are also bounded in that they will not describe more than 4096 mini-slots into the future. The latter limit is intended to bound the number of future mini-slots that each cable modem is required to track. A cable modem is able to support multiple outstanding MAPS. Even though multiple MAPs may be outstanding, the sum of the number of mini-slots they describe will not exceed 4096. The set of all maps, taken together, describes every mini-slot in the upstream channel. If a cable modem fails to receive a MAP describing a particular interval, it will not transmit during that interval.

FIG. 6 illustrates a protocol exchange between a cable modem and CMTS. This example illustrates the interchange between the cable modem and the CMTS when the cable modem has data to transmit. If a cable modem has a data PDU available for transmission, then the following steps occur:

1. At time $t_1$, the CMTS transmits a MAP whose effective starting time is $t_3$. Within this MAP is a Request IE which will start at $t_5$. The difference between $t_1$ and $t_3$ is needed to allow for:
  Downstream propagation delay (including FEC interleaving) to allow all CMs to receive the MAP;
  Processing time at the cable modem (allows the cable modems to parse the MAP and translate it into transmission opportunities);
  Upstream propagation delay (to allow the cable modem's transmission of the first upstream data to begin in time to arrive at the CMTS at time $t_3$).

2. At $t_2$, the cable modem receives this MAP and scans it for request opportunities. In order to minimize request collisions, it calculates $t_6$ as a random offset based on the Data Backoff Start value in the most recent MAP.

3. At $t_4$, the cable modem transmits a request for as many mini-slots as needed to accommodate the PDU. Time $t_4$ is chosen based on the ranging offset so that the request will arrive at the CMTS at $t_6$.

4. At $t_6$, the CMTS receives the request and schedules it for service in the next MAP. (The choice of which requests to grant will vary with the class of service requested, any competing requests, and the algorithm used by the CMTS.)

5. At $t_7$, the CMTS transmits a MAP whose effective starting time is $t_9$. Within this MAP, a data grant for the CM will start at $t_{11}$.

6. At $t_8$, the cable modem receives the MAP and scans for its data grant.

7. At $t_{10}$, the CM transmits its data PDU so that it will arrive at the CMTS at $t_{11}$. Time $t_{10}$ is calculated from the ranging offset as in step 3 above.

Steps 1 and 2 need not contribute to access latency if cable modems routinely maintain a list of request opportunities. At step 3, the request may collide with requests from other cable modems and be lost. The CMTS does not directly detect the collision. The cable modem determines that a collision (or other reception failure) occurred when the next MAP fails to include acknowledgment of the request. The cable modem will then perform a back-off algorithm and retry.

At step 4, the CMTS scheduler fail to accommodate the request within the next MAP. If so, it will reply with a zero-length grant in that MAP or discard the request by giving no grant at all. It will continue to report this zero-length grant in all succeeding maps until the request can be granted or is discarded. This will signal to the cable modem that the request is still pending. So long as the cable modem is receiving a zero-length grant, it will not issue new requests for that service queue.

Since many different scheduling algorithms can be implemented in the CMTS, the DOCSIS specification does not mandate a particular scheduling algorithm. Instead, DOCSIS describes the protocol elements by which bandwidth is requested and granted. Cable modems may issue requests to the CMTS for upstream bandwidth. The CMTS transmit allocation MAP PDUs on the downstream channel define the allowed usage of each mini-slot.

Contention Resolution

The DOCSIS specification mandates the method of contention resolution as the truncated binary exponential back-off, with the initial back-off window and the maximum back-off window controlled by the CMTS. The values are specified as part of the Bandwidth Allocation Map (MAP) MAC message and represent a power-of-two value. For example, a value of 4 indicates a window between 0 and 15; a value of 10 indicates a window between 0 and 1023.

When a cable modem has information to send and wants to enter the contention resolution process, it sets its internal back-off window equal to the Data Backoff Start defined in the MAP currently in effect. The cable modem will randomly select a number within its back-off window. This random value indicates the number of contention transmit opportunities which the cable modem will defer before transmitting. A cable modem will only consider contention transmit opportunities for which this transmission would have been eligible. These are defined by either Request IEs or Request/Data IEs in the MAP. Note: Each IE can represent multiple transmission opportunities.

As an example, consider a cable modem whose initial back-off window is 0 to 15 and it randomly selects the number 11. The cable modem must defer a total of 11 contention transmission opportunities. If the first available Request IE is for 6 requests, the cable modem does not use this and has 5 more opportunities to defer. If the next Request IE is for 2 requests, the cable modem has 3 more to defer. If the third Request IE is for 8 requests, the cable modem transmits on the fourth request, after deferring for 3 more opportunities.

After a contention transmission, the cable modem waits for a Data Grant (Data Grant Pending) or Data Acknowledge in a subsequent MAP. Once either is received, the contention resolution is complete. The cable modem determines that the contention transmission was lost when it finds a MAP without a Data Grant (Data Grant Pending) or Data Acknowledge for it and with an Ack time more recent than the time of transmission. The cable modem will now increase its back-off window by a factor of two, as long as it is less than the maximum back-off window. The cable modem will randomly select a number within its new back-off window and repeat the deferring process described above.

This re-try process continues until the maximum number of retries (16) has been reached, at which time the PDU will be discarded. The maximum number of retries is independent of the initial and maximum back-off windows that are defined by the CMTS. If the cable modem receives a unicast Request or Data Grant at any time while deferring for this SID, it will stop the contention resolution process and use the explicit transmit opportunity.

The CMTS has much flexibility in controlling the contention resolution. At one extreme, the CMTS may choose to set up the Data Backoff Start and End to emulate an Ethernet-style back-off with its associated simplicity and distributed nature, but also its fairness and efficiency issues. This would be done by setting Data Backoff Start=0 and End=10 in the MAP. At the other end, the CMTS may make the Data Backoff Start and End identical and frequently update these values in the MAP so all cable modems are using the same, and hopefully optimal, back-off window.

CM Bandwidth Utilization

The following rules govern the response a CM makes when processing maps. These standard behaviors can be overridden by the CM's Request/Transmission Policy:

1. A cable modem will first use any Grants assigned to it. Next, the CM will use any unicast REQ for it. Finally, the cable modem will use the next available broadcast/multicast REQ or REQ/Data IEs for which it is eligible.

2. A cable modem will not have more than one Request outstanding at a time for a particular Service ID.

3. If a cable modem has a Request pending, it will not use intervening contention intervals for that Service ID.

DOCSIS CMTS Scheduling

DOCSIS scheduling services are designed to improve the efficiency of the poll/grant process. By specifying a scheduling service and its associated quality-of-service (QoS) parameters, the DOCSIS CMTS can anticipate the throughput and latency needs of the upstream traffic and provide polls and/or grants at the appropriate times.

Each service is tailored to a specific type of data flow as described below. The basic services comprise:

Unsolicited Grant Service (UGS)
Real-Time Polling Service (rtPS)
Unsolicited Grant Service with Activity Detection (UGS-AD)
Non-Real-Time Polling Service (nrtPS)
Best Effort (BE) service.

FIG. 7 illustrates the relationship between the scheduling services and the related QoS parameters. Each of these is discussed in more detail below:

Unsolicited Grant Service

The Unsolicited Grant Service (UGS) is designed to support real-time service flows that generate fixed size data packets on a periodic basis, such as Voice over IP. The UGS service offers fixed size grants on a real-time periodic basis, which eliminate the overhead and latency of cable modem requests and assure that grants will be available to meet the flow's real-time needs.

The CMTS provides fixed size data grants at periodic intervals to the Service Flow. In order for this service to work correctly, the Request/Transmission Policy setting will be such that the cable modem is prohibited from using any contention request or request/data opportunities and the CMTS does not provides any unicast request opportunities. The Request/Transmission Policy also prohibits piggyback requests. This will result in the cable modem only using unsolicited data grants for upstream transmission. The key service parameters are the Unsolicited Grant Size, the Nominal Grant interval, the Tolerated Grant Jitter and the Request/Transmission Policy.

ATM CBR (Constant Bit Rate) Services

The Constant Bit Rate (CBR) service class is intended for real-time applications, i.e. those requiring tightly constrained delay and delay variation, as would be appropriate for voice and video applications. The consistent availability of a fixed quantity of bandwidth is considered appropriate for CBR service. Cells which are delayed beyond the value specified by CTD (cell transfer delay) are assumed to be significantly less value to the application.

For CBR, the following ATM attributes are specified:
PCR/CDVT (peak cell rate/cell delay variation tolerance)
Cell Loss Rate
CTD/CDV
CLR may be unspecified for CLP=1.

Real-Time Polling Service

The Real-Time Polling Service (rtPS) is designed to support real-time service flows that generate variable size data packets on a periodic basis, such as MPEG video. The service offers real-time, periodic, unicast request opportunities, which meet the flow's real-time needs and allow the CM to specify the size of the desired grant. This service requires more request overhead than UGS, but supports variable grant sizes for optimum data transport efficiency.

The CMTS will provide periodic unicast request opportunities. In order for this service to work correctly, the Request/Transmission Policy setting will be such that the cable modem is prohibited from using any contention request or request/data opportunities. The Request/Transmission Policy will also prohibit piggyback requests. The CMTS may issue unicast request opportunities as prescribed by this service even if a grant is pending. This will result in the cable modem using only unicast request opportunities in order to obtain upstream transmission opportunities (the cable modem could still use unsolicited data grants for upstream transmission as well). All other bits of the Request/Transmission Policy are not relevant to the fundamental operation of this scheduling service and should be set according to network policy. The key service parameters are the Nominal Polling Interval, the Tolerated Poll Jitter and the Request/Transmission Policy.

ATM Real Time VBR

The real time VBR service class is intended for real-time applications, i.e., those requiring tightly constrained delay and delay variation, as would be appropriate for voice and video applications. Sources are expected to transmit at a rate which varies with time. Equivalently the source can be described "bursty". Cells which are delayed beyond the value specified by CTD are assumed to be of significantly less value to the application. Real-time VBR service may support statistical multiplexing of real-time sources, or may provide a consistently guaranteed QoS.

For real time VBR, the following ATM attributes are specified:
PCR/CDVT
CLR
CTD/CDV
SCR and BT (sustainable cell rate and burst tolerance)

Unsolicited Grant Service with Activity Detection

The Unsolicited Grant Service with Activity Detection (UGS/AD) is designed to support UGS flows that may become inactive for substantial portions of time (i.e. tens of milliseconds or more), such as Voice over IP with silence suppression. The service provides Unsolicited Grants when the flow is active and unicast polls when the flow is inactive. This combines the low overhead and low latency of UGS with the efficiency of rtPS. Though USG/AD combines UGS and rtPS, only one scheduling service is active at a time.

The CMTS will provide periodic unicast grants, when the flow is active, but will revert to providing periodic unicast request opportunities when the flow is inactive. The CMTS can detect flow inactivity by detecting unused grants. However, the algorithm for detecting a flow changing from an active to an inactive state is dependent on the CMTS implementation. In order for this service to work correctly, the Request/Transmission Policy setting will be such that the cable modem is prohibited from using any contention request or request/data opportunities. The Request/Transmission Policy will also prohibit piggyback requests. This results in the cable modem using only unicast request opportunities in order to obtain upstream transmission opportunities. However, the cable modem will use unsolicited data grants for upstream transmission as well.

All other bits of the Request/Transmission Policy are not relevant to the fundamental operation of this scheduling service and should be set according to network policy. The key service parameters are the Nominal Polling Interval, the Tolerated Poll Jitter, the Nominal Grant Interval, the Tolerated Grant Jitter, the Unsolicited Grant Size and the Request/Transmission Policy.

In UGS-AD service, when restarting UGS after an interval of rtPS, the CMTS will provide additional grants in the first (and/or second) grant interval such that the cable modem receives a total of one grant for each grant interval from the time the cable modem requested restart of UGS, plus one additional grant.

Because the Service Flow is provisioned as a UGS flow with a specific grant interval and grant size, when restarting UGS, the cable modem will not request a different sized grant than the already provisioned UGS flow. As with any Service Flow, changes can only be requested with a DSC command. If the restarted activity requires more than one grant per interval, the CM MUST indicate this in the Active Grants field of the UGSH beginning with the first packet sent.

The Service Flow Extended Header Element allows for the cable modem to dynamically state how many grants per interval are required to support the number of flows with activity present. In UGS/AD, the cable modem may use the Queue Indicator Bit in the UGSH. The remaining seven bits of the UGSH define the Active Grants field. This field defines the number of grants within a Nominal Grant Interval that this Service Flow currently requires.

When using UGS/AD, the cable modem will indicate the number of requested grants per Nominal Grant Interval in this field. The Active Grants field of the UGSH is ignored with UGS without Activity Detection. This field allows the cable modem to signal to the CMTS to dynamically adjust the number of grants per interval that this UGS Service Flow is actually using. The cable modem will not request more than the number of Grants per Interval in the ActiveQoSParameterSet.

If the CMTS allocates additional bandwidth in response to the QI bit, it will use the same rate limiting formula as UGS, but the formula only applies to steady state periods where the CMTS has adjusted the grants_per_interval to match the active_grants requested by the cable modem.

When the cable modem is receiving unsolicited grants and it detects no activity on the Service Flow, it may send one packet with the Active Grants field set to zero grants and then cease transmission. Because this packet may not be received by the CMTS, when the Service Flow goes from inactive to active the cable modem will be able to restart transmission with either polled requests or unsolicited grants.

Non-Real-Time Polling Service

The Non-Real-Time Polling Service (nrtPS) is designed to support non real-time service flows that require variable size data grants on a regular basis, such as high bandwidth FTP. The service offers unicast polls on a regular basis which assures that the flow receives request opportunities even during network congestion. The CMTS typically polls nrtPS SIDs on an (periodic or non-periodic) interval on the order of one second or less.

The CMTS provide timely unicast request opportunities. In order for this service to work correctly, the Request/Transmission Policy setting will be such that the cable modem is allowed to use contention request opportunities. This will result in the cable modem using contention request opportunities as well as unicast request opportunities and unsolicited data grants. All other bits of the Request/Transmission Policy are not relevant to the fundamental operation of this scheduling service and should be set according to network policy. The key service parameters are Nominal Polling Interval, Minimum Reserved Traffic Rate, Maximum Sustained Traffic Rate, Request/Transmission Policy and Traffic Priority.

ATM Non-Real time VBR

The non-real time VBR service class is intended for non-real time applications which have 'bursty' traffic characteristics and which can be characterized in terms of a GCRA. For those cells which are transferred, it expects a bound on the cell transfer delay. Non-real time VBR service supports statistical multiplexing of connections.

For real time VBR, the following ATM attributes are specified:
PCR/CDVT
CLR
CTD
SCR and BT Best Effort Service The intent of the Best Effort (BE) service is to provide efficient service to best effort traffic. In order for this service to work correctly, the Request/Transmission Policy setting will be such that the cable modem is allowed to use contention request opportunities. This will result in the cable modem using contention request opportunities as well as unicast request opportunities and unsolicited data grants. All other bits of the Request/Transmission Policy are not relevant to the fundamental operation of this scheduling service and should be set according to network policy. The key service parameters are the Minimum Reserved Traffic Rate, the Maximum Sustained Traffic Rate, and the Traffic Priority.

ATM UBR (Unspecified Bit Rate)

The UBR service class is intended for delay-tolerant or non-real-time applications, i.e., those which do not require tightly constrained delay and delay variation, such as traditional computer communications applications. Sources are expected to transmit non-continuous bursts of cells. UBR service supports a high degree of statistical multiplexing among sources. UBR service includes no notion of a per-VC allocated bandwidth resource. Transport of cells in UBR service is not necessarily guaranteed by mechanisms operating at the cell level. However it is expected that resources will be provisioned for UBR service in such a way as to make it usable for some set of applications. UBR service may be considered as interpretation of the common term "best effort service".

For UBR, the following ATM attributes are specified:
PCR/CDVT

ATM ABR (Available Bit Rate)

Many applications have the ability to reduce their information transfer rate if the network requires them to do so. Likewise, they may wish to increase their information transfer rate if there is extra bandwidth available within the network. There may not be deterministic parameters because the users are willing to live with unreserved bandwidth. To support traffic from such sources in an ATM network will require facilities different from those for Peak Cell Rate of Sustainable Cell Rate traffic. The ABR service is designed to fill this need.

Relevant Encodings for the Upstream Scheduling

Service Flow Scheduling Type

The value of this parameter specifies which upstream scheduling service is used for upstream transmission requests and packet transmissions. If this parameter is omitted, then the Best Effort service will be assumed. This parameter is only applicable at the CMTS. If defined, this parameter MUST be enforced by the CMTS.

| Type | Length | Value |
|---|---|---|
| 24.15 | 1 | 0 Reserved |
| | | 1 for Undefined (CMTS implementation-dependent 1) |
| | | 2 for Best Effort |
| | | 3 for Non-Real-Time Polling Service |
| | | 4 for Real-Time Polling Service |
| | | 5 for Unsolicited Grant Service with Activity Detection |
| | | 6 for Unsolicited Grant Service |
| | | 7 through 255 are reserved for future use |

Request/Transmission Policy

The value of this parameter specifies 1) which IUC opportunities the cable modem uses for upstream transmission requests and packet transmissions for this Service Flow, 2) whether requests for this Service Flow may be piggybacked with data and 3) whether data packets transmitted on this Service Flow can be concatenated, fragmented, or have their payload headers suppressed. For UGS, it also specifies how to treat packets that do not fit into the UGS grant. The data grants referred to include both short and long data grants.

Bit #0—The Service Flow will not use "all cable modems" broadcast request opportunities.

Bit #1—The Service Flow will not use Priority Request multicast request opportunities.

Bit #2—The Service Flow will not use Request/Data opportunities for Requests.

Bit #3—The Service Flow will not use Request/Data opportunities for Data.

Bit #4—The Service Flow will not piggyback requests with data.

Bit #5—The Service Flow will not concatenate data.

Bit #6—The Service Flow will not fragment data.

Bit #7—The Service Flow will not suppress payload headers.

Bit #8—The Service Flow will drop packets that do not fit in the Unsolicited Grant Size.

Priority Request Service IDs

These Service IDs (0x3Exx) are reserved for Request IEs:
If 0x01 bit is set, priority zero can request.
If 0x02 bit is set, priority one can request.
If 0x04 bit is set, priority two can request.
If 0x08 bit is set, priority three can request.
If 0x10 bit is set, priority four can request.
If 0x20 bit is set, priority five can request.
If 0x40 bit is set, priority six can request.
If 0x80 bit is set, priority seven can request.

Bits can be combined as desired by the CMTS upstream scheduler for any Request IUCs.

Traffic Priority

The value of this parameter specifies the priority assigned to a Service Flow. Given two Service Flows identical in all QoS parameters besides priority, the higher priority Service Flow should be given lower delay and higher buffering preference. For otherwise non-identical Service Flows, the priority parameter will not take precedence over any conflicting Service Flow QoS parameter. The specific algorithm for enforcing this parameter is not mandated here.

For upstream service flows, the CMTS should use this parameter when determining precedence in request service and grant generation, and the cable modem will preferentially select contention Request opportunities for Priority Request Service IDs based on this priority and its Request/Transmission Policy.

To illustrate the problem current CMTS scheduling under DOCSIS presents. an example application known commonly in the industry as "PacketCable" is discussed below. PacketCable is a project conducted by Cable Television Laboratories, Inc. and its member companies. The PacketCable project is aimed at defining interface specifications that can be used to develop interoperable equipment capable of providing packet-based voice, video and other high-speed multimedia services over hybrid fiber coax (HFC) cable systems utilizing the DOCSIS protocol. PacketCable utilizes a network superstructure that overlays the two-way data-ready broadband cable access network. While the initial PacketCable offering will be packet-based voice communications for existing and new cable subscribers, the long-term project vision encompasses a large suite of packet-based capabilities.

The application of NCS PacketCable call setup will be used throughout when discussing the various embodiments of the invention. The example uses the PacketCable NCS call protocol along with the DQoS setup procedure. The PacketCable NCS protocol requires a big number of messages passed between the eMTA (embedded MTA: a device which includes both the VoIP functionality and the cable modem functionality). The messages passed in their protocol flow are shown in FIG. 8, FIG. 9 and FIG. 10.

There are three alternatives to the PacketCable NCS call setup using strict DOCSIS mechanisms. The first one is the simplest one and put the call signaling messaging in the request/contention area, the second is to use the polled requests for the NCS call signaling and the last, is to use the priority requests. These are discussed in turn:

Using Broadcast Request Opportunities

In the method that uses broadcast request opportunities the NCS call signaling uses the best effort scheduling type. There are two problems with such kind of a use: the first one is that the time it takes the eMTA to send a packet, and the problem of using a contention are that is shared with the data packets.

The first issue is that assuming there is no contention on the Cable Modem requests, the time it takes the packet to be transmitted. FIG. 11, FIG. 12 and FIG. 13 show all the messages that are exchanged between the eMTA and the CMTS for transmission of the call signaling packets when using broadcast request opportunities. Referring to FIGS. 11-13, it can be shown that there are 4 packets that have to be sent upstream before the phone rings on the originator and 3 packets that has to be send out on the far-end. This is assuming that the dial map is designed in such a way that the first time the eMTA contacts the CMTS is the time that all the digits are completed.

To further analyze, certain designs of a CMTS issue MAP messages every 4 milliseconds. Thus using that metric, on average, packets have to be waiting in the queue of the CMTS for 2 milliseconds to make the request. Further, it takes 1 millisecond for the message to propagate to the CMTS. Also assume that the request can be granted in the first MAP message and on average the packet would be scheduled from the arrival of MAP within 2 milliseconds. It takes 2 milliseconds for the MAP packet to be received from the CMTS to CM.

The result is shown in Table 3 below:

TABLE 3

| Explanation | Delay | Total Delay |
| --- | --- | --- |
| The request is send in the contention area | 2 ms | 2 ms |
| Interleaving delay | 3 ms | 5 ms |
| Upstream Propagation delay | 1 ms | 6 ms |
| The CMTS processes the request and schedules | 1 ms | 7 ms |
| Downstream propagation delay | 1 ms | 8 ms |
| The data area is used | 2 ms | 10 ms |
| Interleaving delay | 3 ms | 13 ms |
| The data is received by the CMTS | 1 ms | 14 ms |

It has to be noted that these numbers assume that the CMTS processing is in such a way that the data grant is issued with the next MAP message. A more realistic number is 15 millisecond average delay between the call signaling packet interception at the Cable Modem to the packet to be arriving at the CMTS for further processing.

If the contribution of cable transmission delay to post dial delay is to be calculated for originating side:

4 upstream messages*15 ms per message delay=60 ms delay.

For the far-end the number is:

3 upstream messages*15 ms per message delay=45 ms delay.

Therefore, 10% of end-to-end delay budget of under one second of post dial delay is consumed by the cable segment transmission.

For the second issue it has been shown that the sharing of request/contention areas with data transmission introduces a very big delay to the system that during congestion intervals it may not be acceptable. It is possible that such is not applicable to a modern scheduler in which engineers the number of contention/requests to the traffic usage pattern. But the issue still remains and since the use of request/contention area cannot be prioritized between SIDs that are on different cable modems, meaning that it is not possible for CMTS to give call signaling packets a preferential treatment. Since the cable transmission delay cannot be guaranteed, this would be reason enough for the request/contention area not to be used. The second alternative is the use of the non-real time polling.

Using Polled Request Opportunities

The polled request opportunity method assumes that all of the NCS call signaling packets are send through the service flows that are using the non-real-time polled scheduling type as defined by DOCSIS. In the non-real time polling the cable modem can use the request/contention grants but the CMTS is responsible for providing timely unicast request opportunities. The problem with this kind of scheduling is that since the CMTS cannot guess which cable modems are in contention in a contention/request opportunity, when a contention is detected, the cable modem should revert to the Unicast Polling Opportunities, which makes the use of the request/contention opportunities during high traffic.

Due to the reasons whether the non-real-time polling or the real-time polling is to be used in such kind of a situation the service flow should not be using the broadcast request opportunities. For the real-time polling the CMTS should be generating a request opportunity for each of the service flow individually. If we use the AT&T numbers the CMTS should be giving unicast request opportunity to each one of the 1000 cable modems. Assuming that a unicast request takes 12 bytes which for the best case of transmission takes 12.5 microseconds of upstream time. For all cable modems, this yields an upstream time of (12.5 microseconds*1000=)12.5 milliseconds.

Assuming that the maintenance overhead and others the minimum interval for the cable modem polling cannot be higher than 7 millisecond intervals. It is important to note that in such a case the whole upstream bandwidth is being used for polling and the upstream bandwidth cannot be used for other data transmission. It is important to consider that the main idea is to be able to use the upstream for the transport of VoIP and other data transmission as well.

Using Priority Request Opportunities

The last method is to use the priority request service IDs for the NCS call signaling packets. In this method all of the NCS call signaling packets use the service flows that has the request transmission policy set as the Cable Modem will not use the broadcast request opportunities and the cable modem will use the priority request multicast opportunities.

Even though the DOCSIS specification defines these fields as strict ordering for lower delay and higher buffering it is possible to use the priority for grouping the service flows for NCS call signaling. Now if it is assumed that all the remaining flows with best effort scheduling type are using the priority zero and the NCS call signaling is using priority 5 then if the CMTS schedules with every MAP cycle a priority 5 request opportunity (using SID x3E20).

In such a case the Internet data using the priority 0 will be using the broadcast request opportunities and the priority 5 request opportunity will be used by the NCS call signaling. The benefit of such a scheme is that there is no waste of bandwidth due to individual poll and at the same time the NCS call signaling packets will not be contending with the NCS data packets.

The only issue with such a method is that the cable modem will use the truncated binary exponential backoff algorithm to pick which opportunity it will utilize, and there are only one global data backoff start and data backoff end settings. If one uses the same values that is being used for the broadcast data opportunities or any of the other contention request opportunities then this would cause an unnecessary bandwidth waste. One solution may be to use the segmented backoff setting bandwidth allocation MAP messages generation in the CMTS scheduler.

The problem with using Priority Requests is as follows. Lets assume that the priority 5 is being used for the NCS call signaling and the data backoff setting of a start value of 0 and an end value of 3 is sufficient for the expected contention probability. We can assume that the broadcast request opportunities use the start value of 2 and an end value of 7. Table 4 below contains the number of mini-slots in one 4 millisecond interval for various symbol rates/modulations:

TABLE 4

| mini-slot size (ticks) | 2 | 4 | 8 | 16 | 32 | 64 | 128 |
|---|---|---|---|---|---|---|---|
| mini-slot size (us) | 12.5 | 25 | 50 | 100 | 200 | 400 | 800 |
| symbol rate | number of mini-slots in 4 ms interval | | | | | | |
| 160000 | N/A | N/A | N/A | N/A | 20 | 10 | 5 |
| 320000 | N/A | N/A | N/A | 40 | 20 | 10 | 5 |
| 640000 | N/A | N/A | 80 | 40 | 20 | 10 | 5 |
| 1280000 | N/A | 160 | 80 | 40 | 20 | 10 | 5 |
| 25600000 | 320 | 160 | 80 | 40 | 20 | 10 | 5 |
| 160000 | N/A | N/A | N/A | N/A | 20 | 10 | 5 |
| 320000 | N/A | N/A | N/A | 40 | 20 | 10 | 5 |
| 640000 | N/A | N/A | 80 | 40 | 20 | 10 | 5 |
| 1280000 | N/A | 160 | 80 | 40 | 20 | 10 | 5 |
| 25600000 | 320 | 160 | 80 | 40 | 20 | 10 | 5 |

Assuming that a request takes 2 mini-slots we get the number of request opportunities on a 4 millisecond interval to be as shown in Table 5:

TABLE 5

| mini-slot size (ticks) | 2 | 4 | 8 | 16 | 32 | 64 | 128 |
|---|---|---|---|---|---|---|---|
| mini-slot size (us) | 12.5 | 25 | 50 | 100 | 200 | 400 | 800 |
| symbol rate | number of requests in 4 ms interval | | | | | | |
| 16000 | N/A | N/A | N/A | N/A | 10 | 5 | 2.5 |
| 32000 | N/A | N/A | N/A | 20 | 10 | 5 | 2.5 |
| 64000 | N/A | N/A | 40 | 20 | 10 | 5 | 2.5 |
| 128000 | N/A | 80 | 40 | 20 | 10 | 5 | 2.5 |
| 2560000 | 160 | 80 | 40 | 20 | 10 | 5 | 2.5 |
| 16000 | N/A | N/A | N/A | N/A | 10 | 5 | 2.5 |
| 32000 | N/A | N/A | N/A | 20 | 10 | 5 | 2.5 |
| 64000 | N/A | N/A | 40 | 20 | 10 | 5 | 2.5 |
| 128000 | N/A | 80 | 40 | 20 | 10 | 5 | 2.5 |
| 2560000 | 160 | 80 | 40 | 20 | 10 | 5 | 2.5 |

If we assume that all the priority request type are being used then we have 8 requests per MAP at least. The difference between using the broadcast request data backoff settings and a specific value for the priority request is: 8 priority values*3 unnecessary requests per MAP interval=24 unnecessary requests.

Due to the fact that the main reason for the use of priority requests is the timely transport of packets it is assumed that at least the initial data backoff setting of priority request opportunities has to be given in each interval. If we take into account that there are at least 4 requests per MAP interval we calculate the wasted interval as shown in Table 6:

TABLE 6

| mini-slot size (ticks) | 2 | 4 | 8 |
|---|---|---|---|
| mini-slot size (us) | 12.5 | 25 | 50 |
| symbol rate | number of requests in 4 ms interval | | |
| 160000 | N/A | N/A | N/A |
| 320000 | N/A | N/A | N/A |
| 640000 | N/A | N/A | 0.666667 |
| 1280000 | N/A | 0.315789 | 0.666667 |
| 25600000 | 0.153846 | 0.315789 | 0.666667 |
| 160000 | N/A | N/A | N/A |
| 320000 | N/A | N/A | N/A |
| 640000 | N/A | N/A | 0.666667 |
| 1280000 | N/A | 0.315789 | 0.666667 |
| 25600000 | 0.153846 | 0.315789 | 0.666667 |

This implies that a minimum of 15% of the upstream minislots will be wasted due to inability of the scheduler to send bandwidth allocation MAP messages with different data backoff settings.

A challenging aspect of DOCSIS CMTS design are problems with scheduling channels and service flows generated therein based upon applications that use the bandwidth provided to them by the cable modem system. Today, the general analysis of the DOCSIS upstream scheduling is carried out in the domain of scheduling the data transmission opportunities.

The request for upstream transmission is assumed to be arrived at the CMTS timely, and a uniform delay distribution is generally assumed for request arrival. For instance, the typical cable modem will have no idea if the application requesting a service flow is an HTTP application or a Voice over IP The main challenge for the CMTS is to meet the delay, bandwidth and other requirements of service flow quality of service encodings by scheduling the data transmission opportunities.

SUMMARY OF THE INVENTION

The invention consists of group poll mechanism that schedules upstream bandwidth for cable modems by pointing a request opportunity normally reserved for a single service flow to more than one service flow. Essentially, instead of using the seldom-utilized poll requests one per service flow, this same request opportunity is pointed to multiple service flows. In such kind of a scheme the group poll mechanism gives the same mini-slot to multiple service flows. This is achieved in a variety of embodiments, discussed below, which include the use of place-holder SIDs and novel mapping of information elements in MAP messages.

BRIEF DESCRIPTION OF THE DRAWINGS

FIG. 7 illustrates the relationship between the scheduling services and the related QoS parameters.

DETAILED DESCRIPTION OF THE INVENTION

In brief, the invention, in various embodiments, consists of a group poll mechanism ("GPM") that schedules upstream bandwidth for cable modems by pointing a request opportunity normally reserved for a single service flow to more than one service flow. Essentially, instead of using the seldom-used poll requests one per service flow, this same request opportunity is pointed to multiple service flows. In such kind of a scheme the GPM gives the same minislot to multiple service flows. If there is only one cable modem that is utilizing the transmission opportunity, then there is no difference between unicast polling and group polling from the viewpoint of cable modem that is making the request.

If more than one cable modem tries to use the same transmission opportunity then a collision would occur and the cable modems have to re-transmit their request. Since cable modems do not use an exponential binary backoff algorithm for unicast poll opportunities, the CMTS should detect the collucion event and then emulate a collision resolution method. Based on an interpretation of the DOCSIS specification, a cable modem would parse its SID and when it finds the match it would record the offset as start of burst, the difference between the next offset and the start of burst will be the burst duration. Based on this scenario, this is one way of generating group poll requests: Use a null-SID to define the burst duration and then take the offset back in the next SID.

Figure 1:
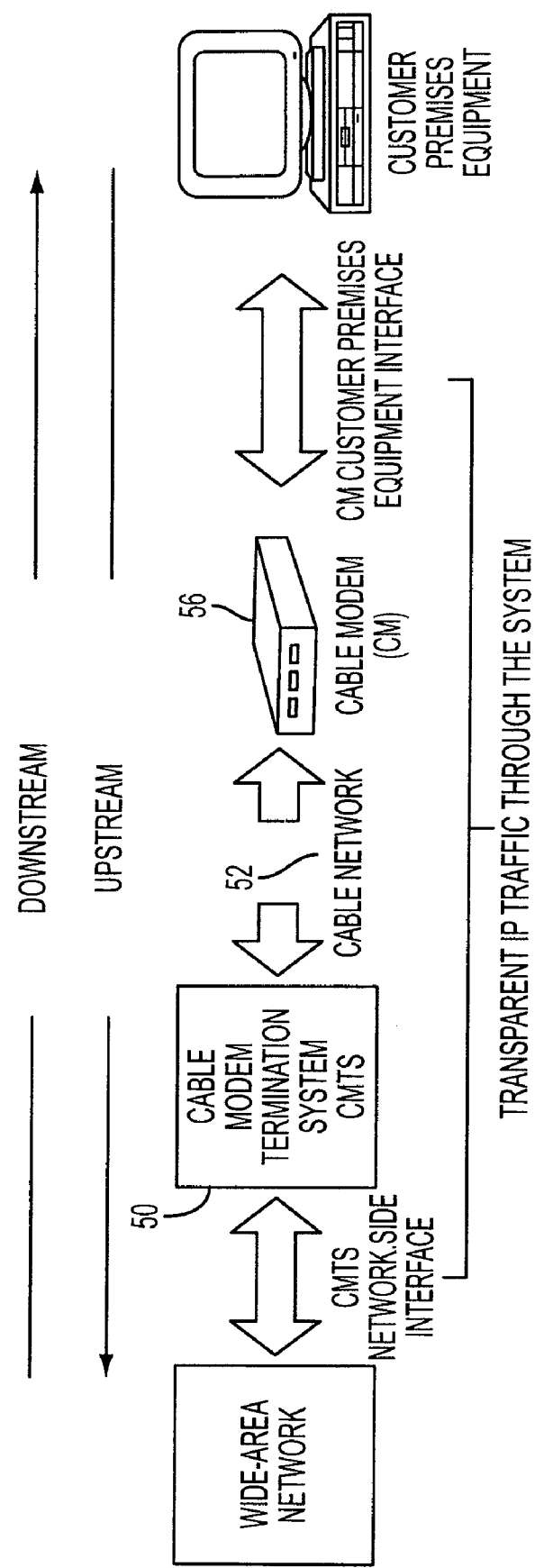
FIG. 1 illustrates a simplified diagram of a conventional cable modem system.
Figure 2:
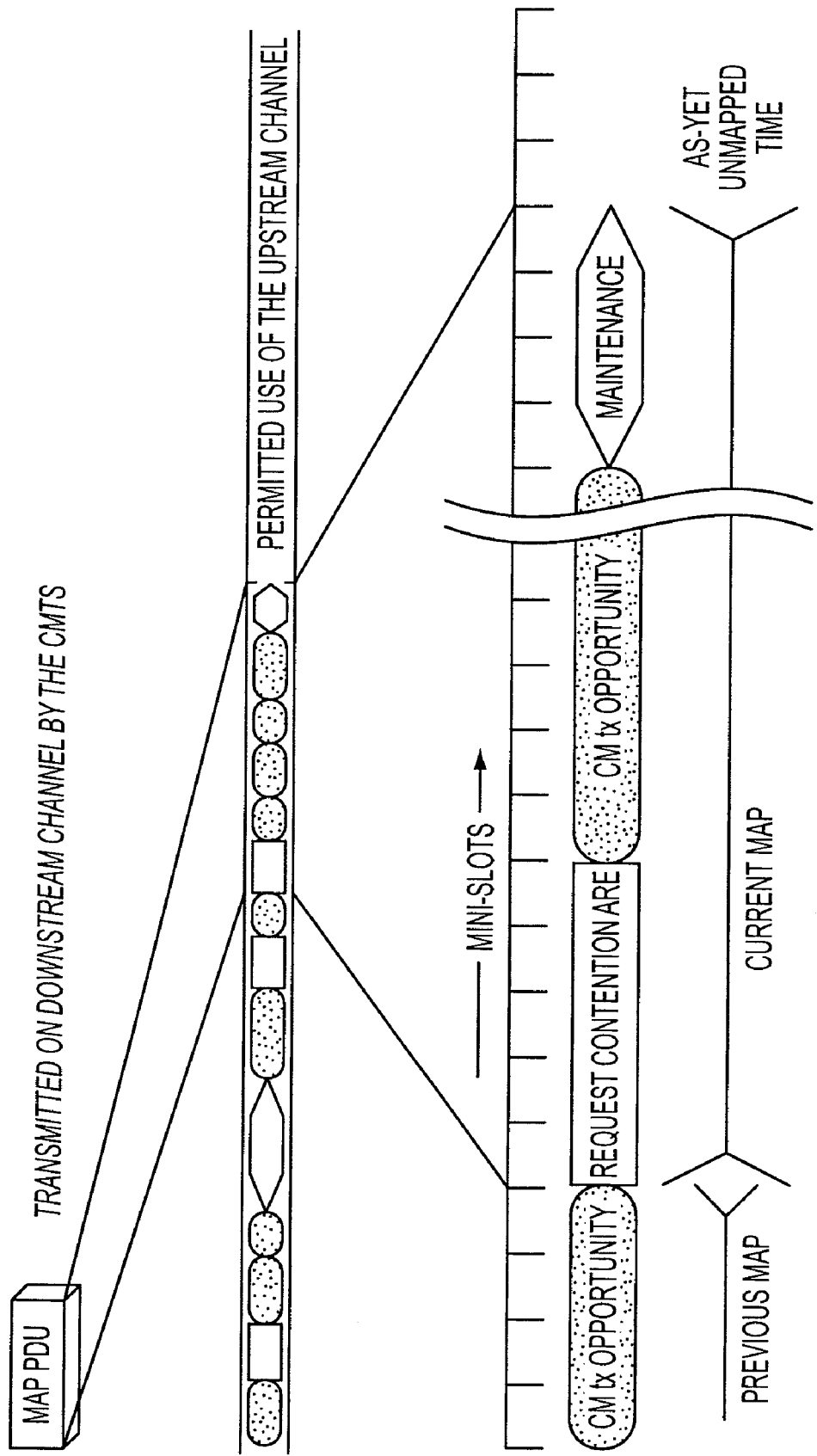
FIG. 2 illustrates the upstream transmission time-line being divided into intervals by the upstream bandwidth allocation mechanism.
Figure 3:
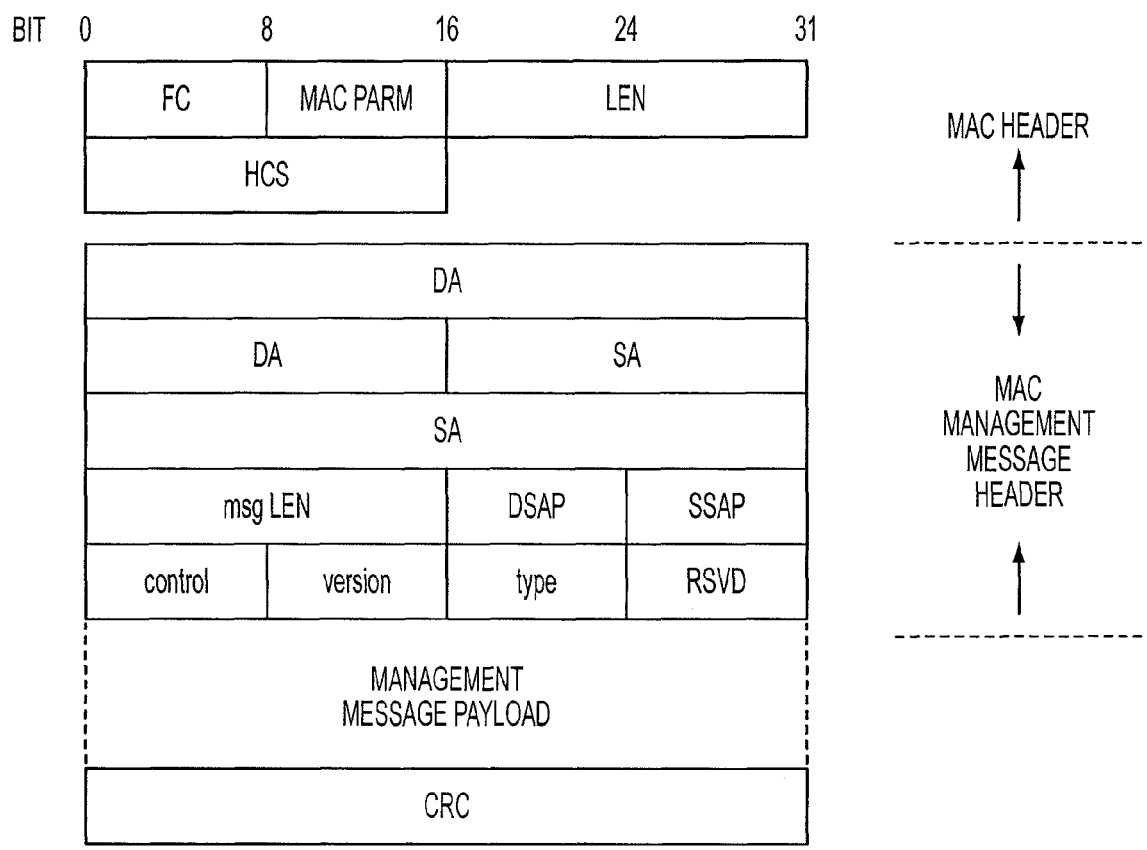
FIG. 3 illustrates a MAC Header and MAC Management Message Header Fields.
Figure 4:
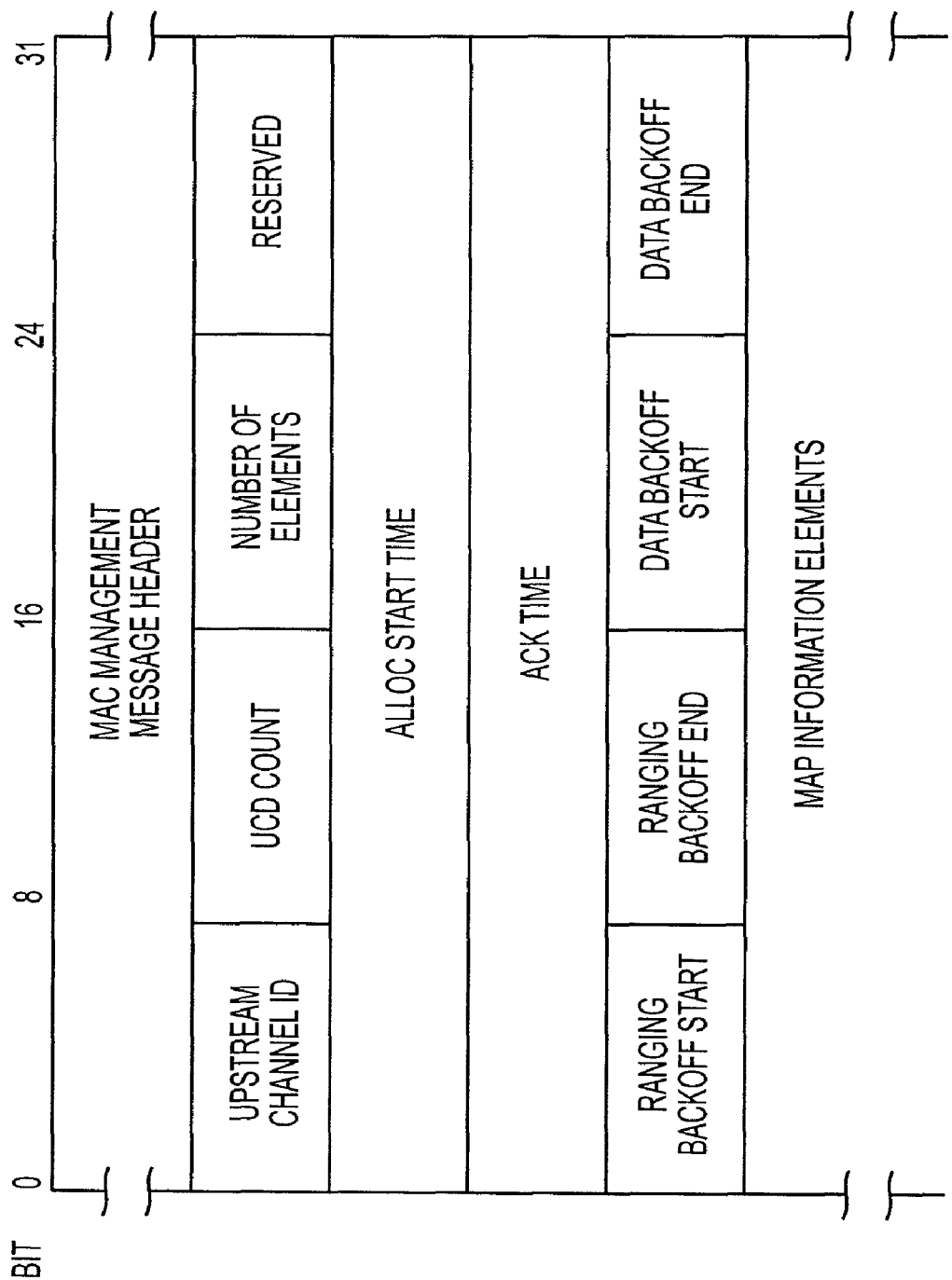
FIG. 4 illustrates the components of a upstream bandwidth allocation MAP including a variable number of information elements.
Figure 5:
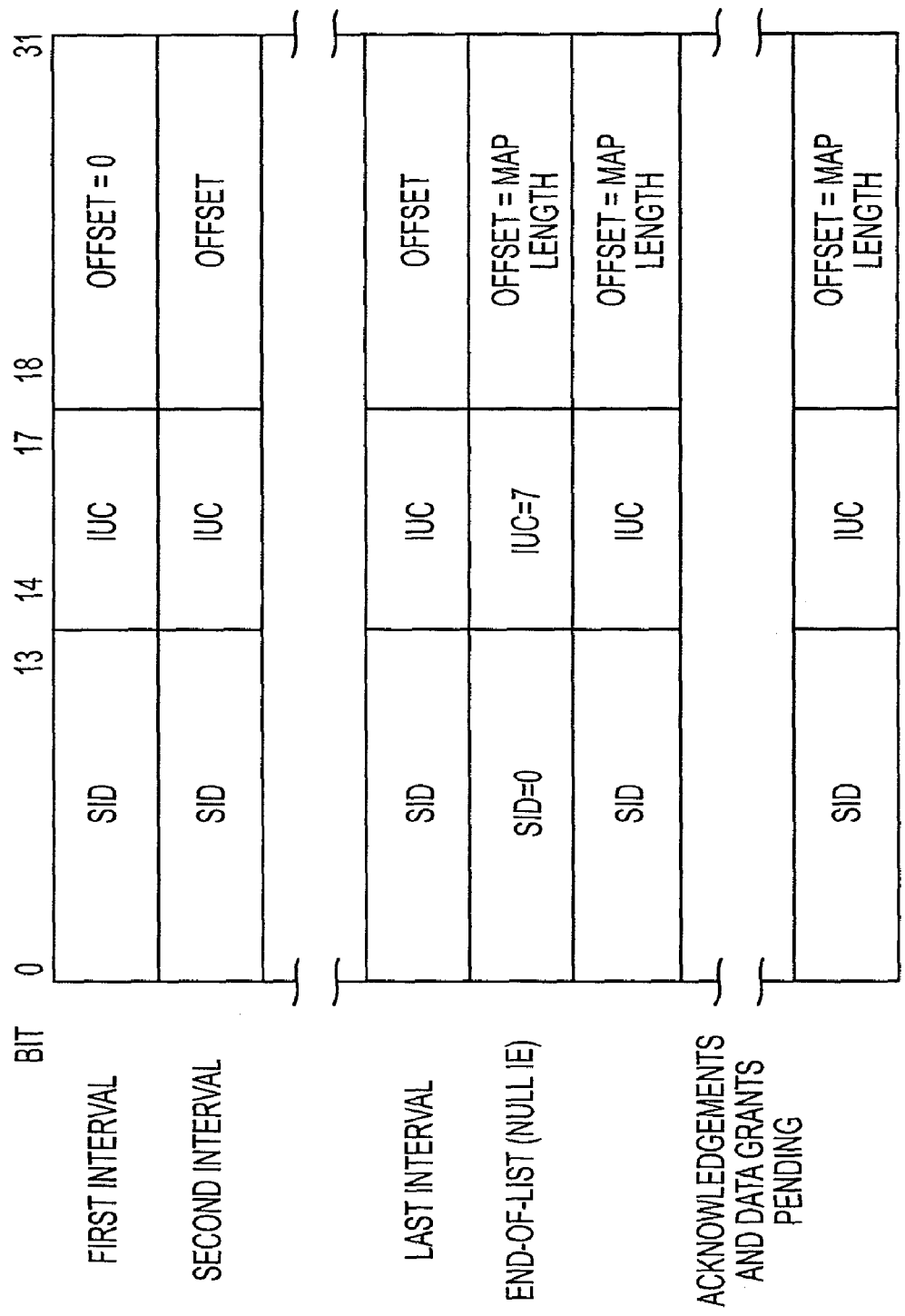
FIG. 5 illustrates the structure of a MAP IE.
Figure 6:
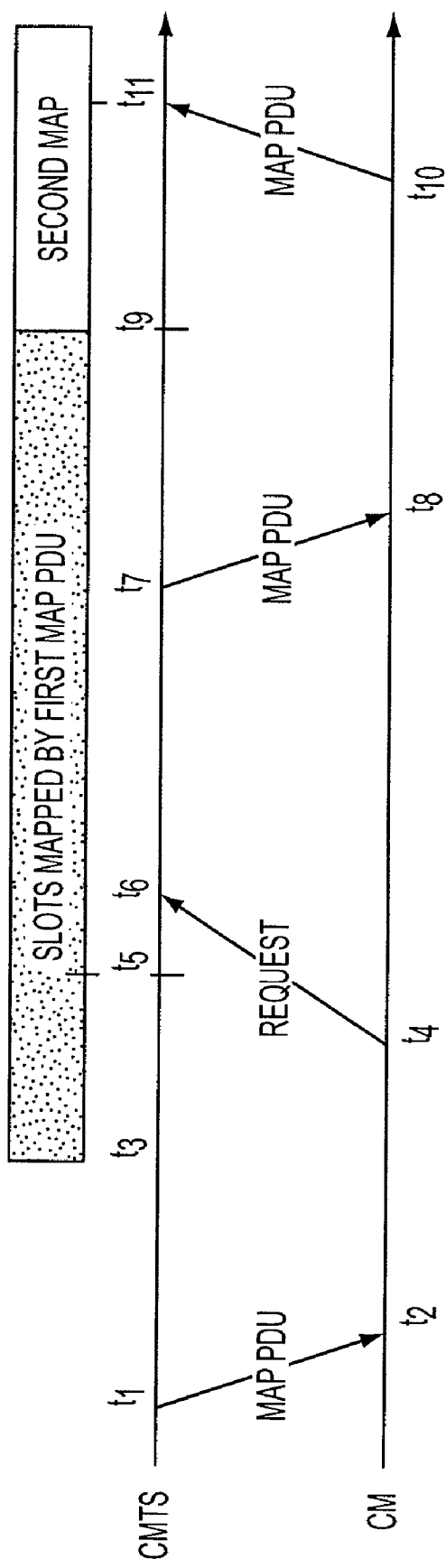
FIG. 6 illustrates a protocol exchange between a cable modem and CMTS.
Figure 8:
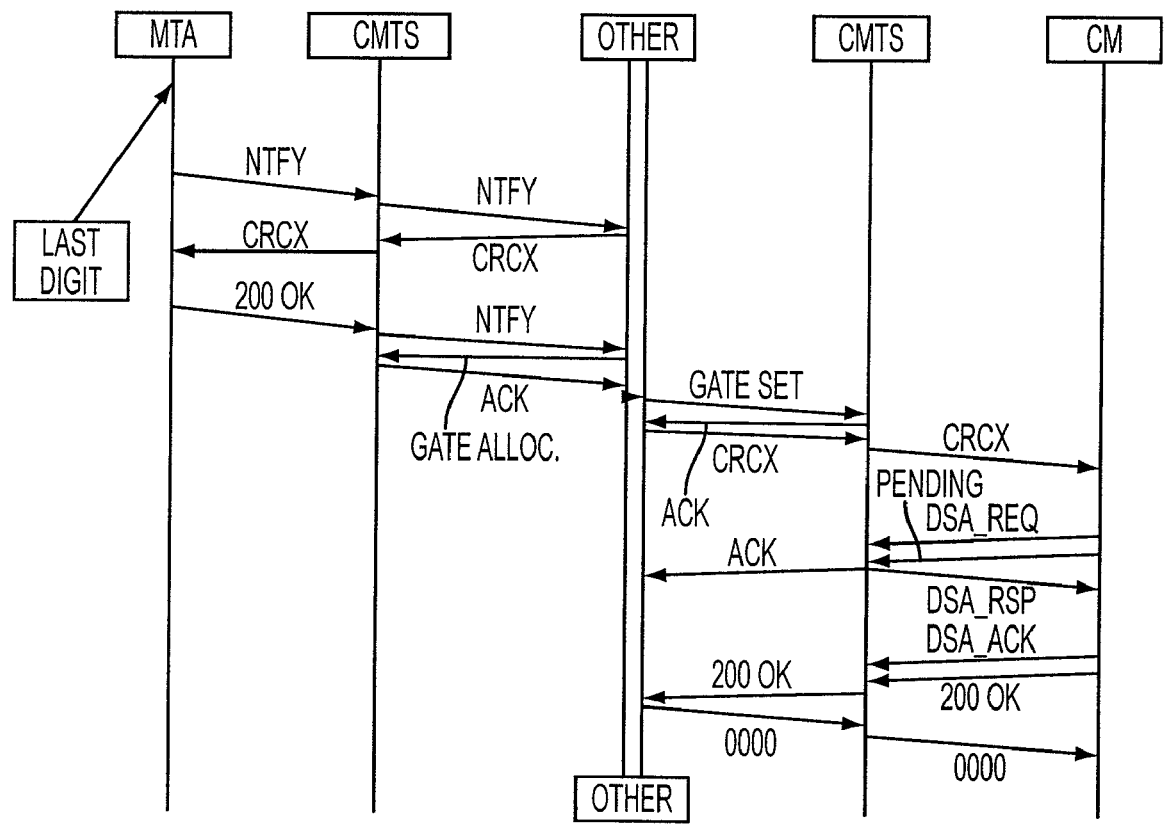
FIG. 8 illustrates a first portion of all of the messages passed in a NCS PacketCable call setup protocol flow.
Figure 9:
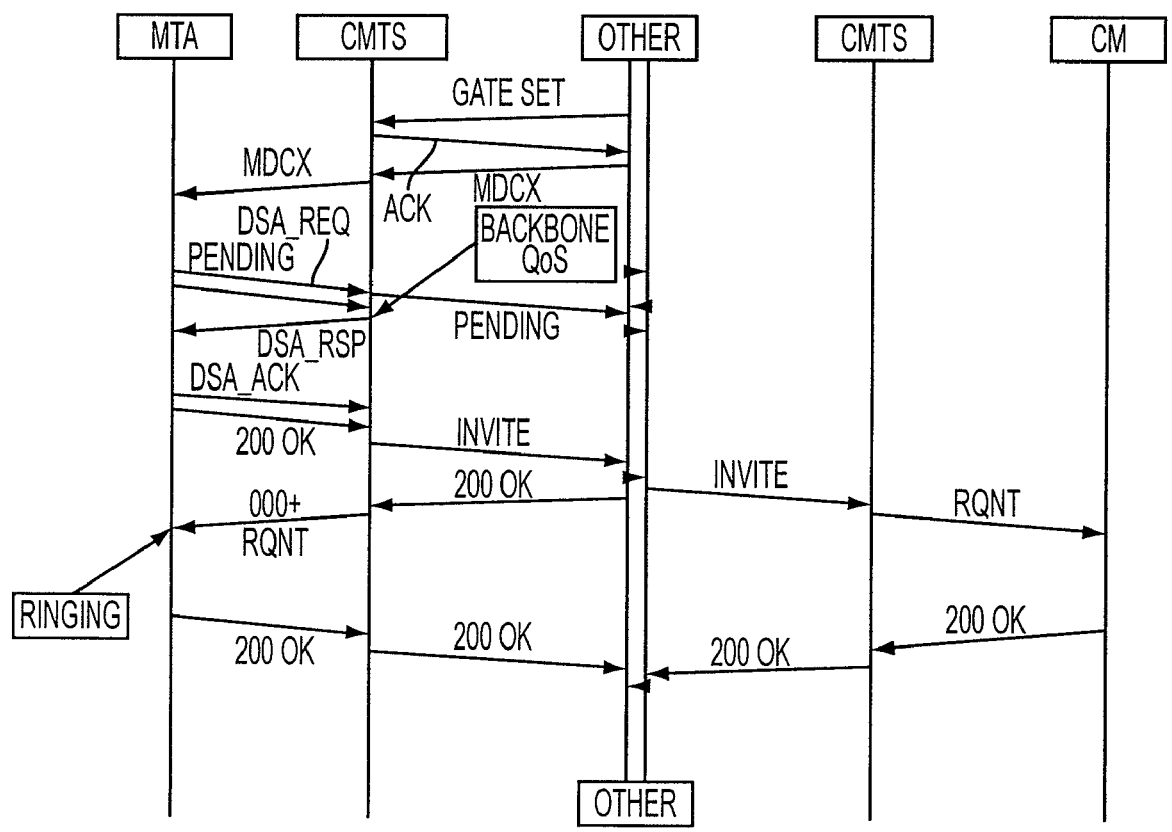
FIG. 9 illustrates a second portion of all of the messages passed in a NCS PacketCable call setup protocol flow.
Figure 10:
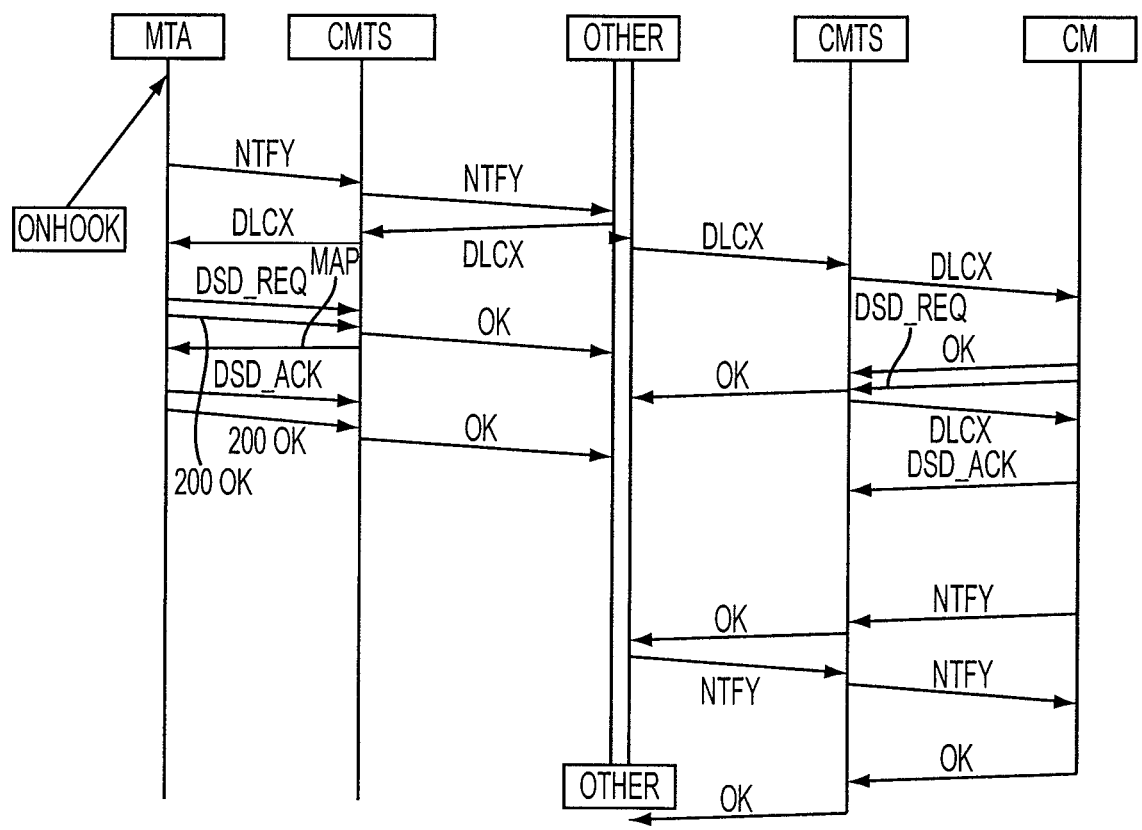
FIG. 10 illustrates a third portion of all of the messages passed in a NCS PacketCable call setup protocol flow.
Figure 11:
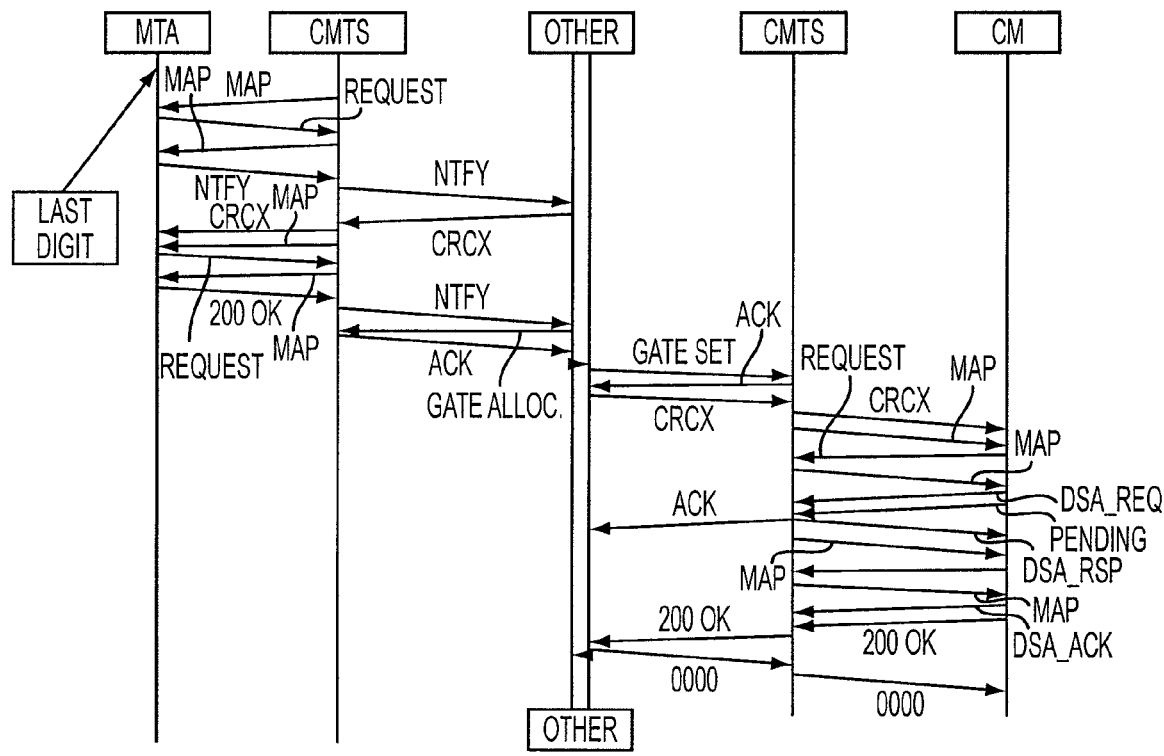
FIG. 11 illustrates a first portion of all the messages that are exchanged between the eMTA and the CMTS for transmission of the call signaling packets when using broadcast request opportunities.
Figure 12:
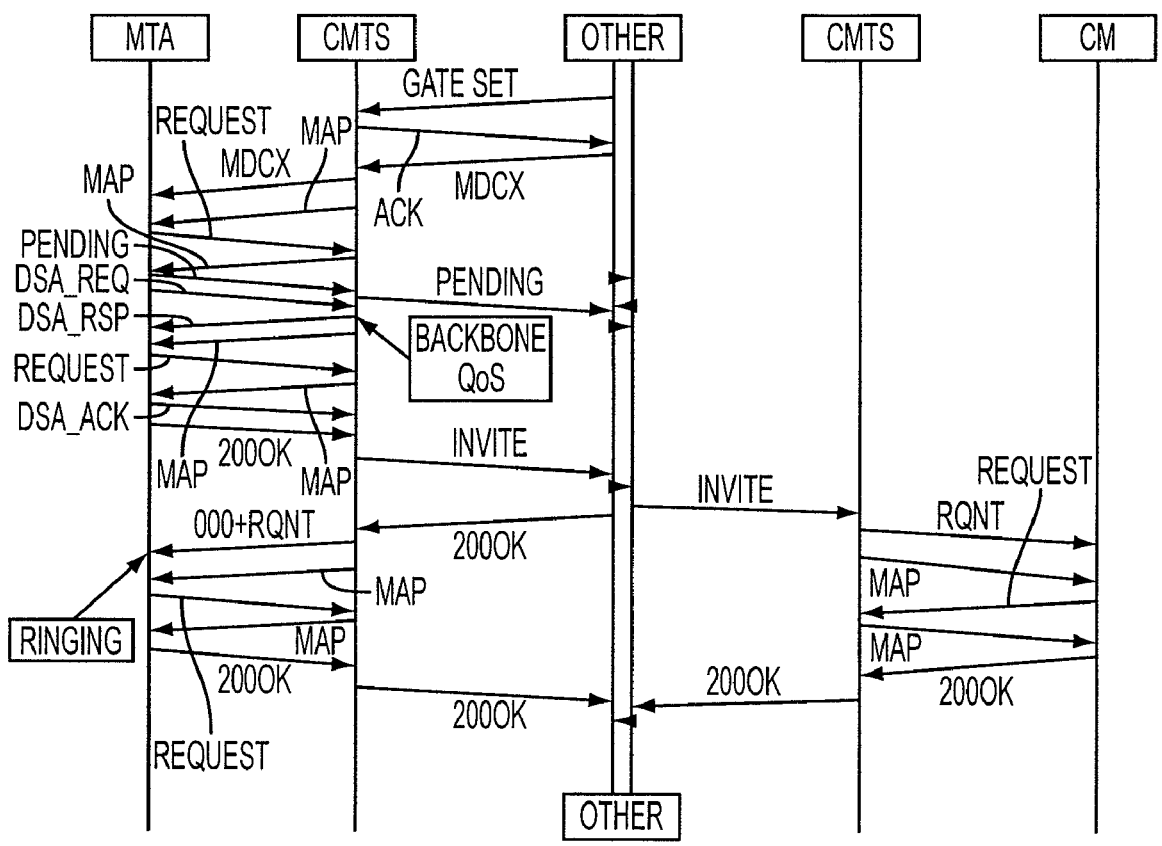
FIG. 12 illustrates a second portion of all the messages that are exchanged between the eMTA and the CMTS for transmission of the call signaling packets when using broadcast request opportunities.
Figure 13:
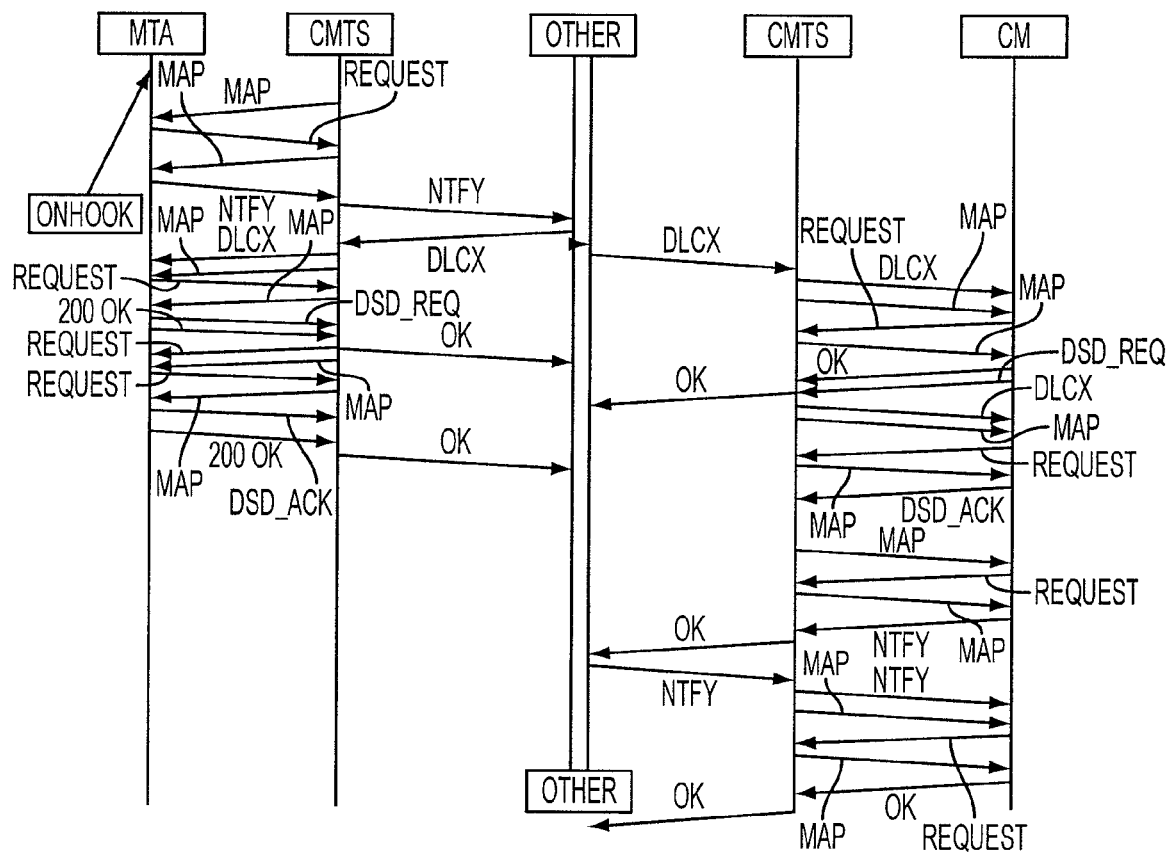
FIG. 13 illustrates a third portion of all the messages that are exchanged between the eMTA and the CMTS for transmission of the call signaling packets when using broadcast request opportunities.
Figure 14:
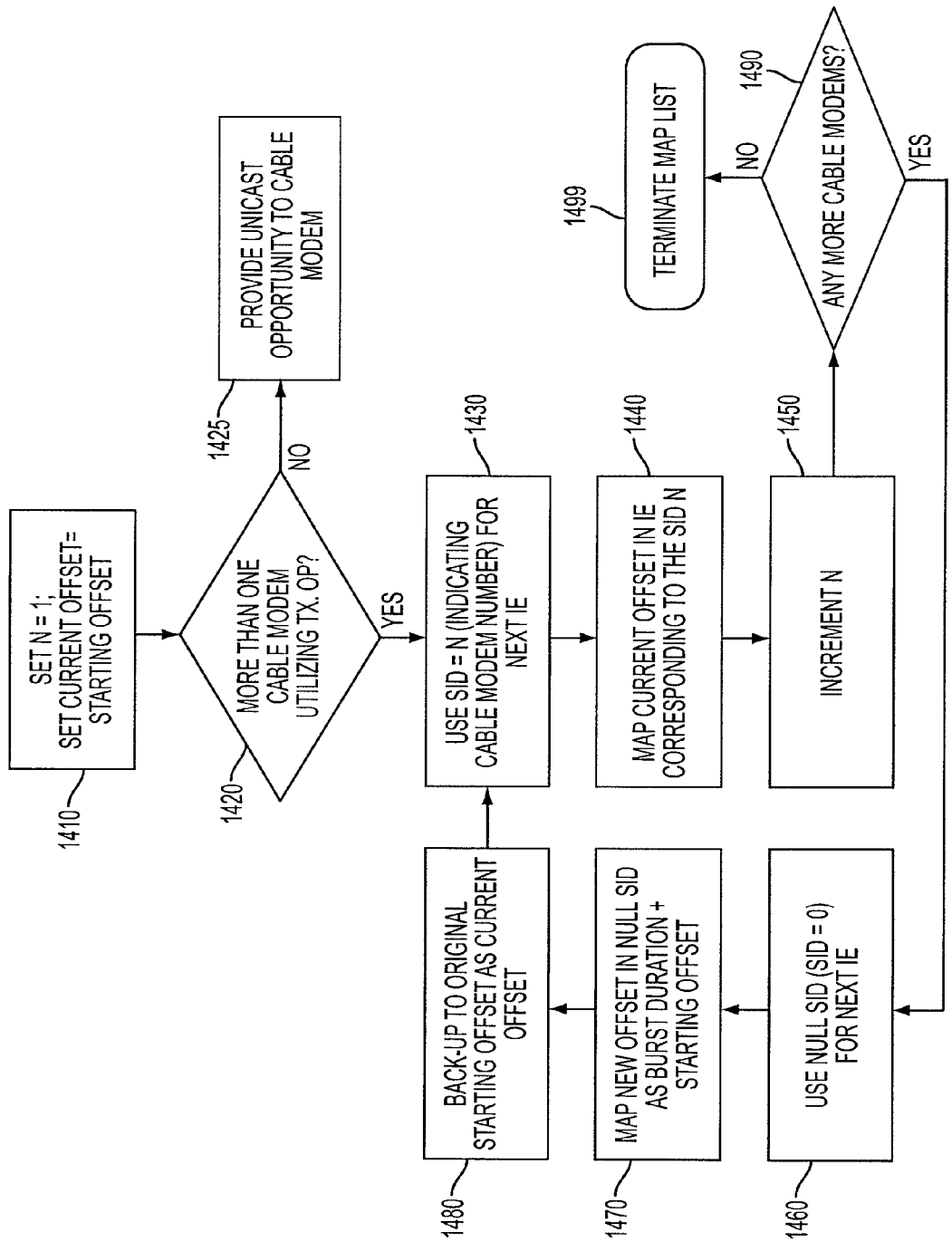
FIG. 14 is a flowchart of one or more embodiments of group polling according to the invention.

FIG. 14 is a flowchart of one or more embodiments of group polling according to the invention. A tracking variable N is utilized to track the number of the cable modem whose IE is being mapped. According to block 1410, the tracking variable N is set to 1. Also according to block 1410, another variable Current Offset, is set to the starting time offset for the MAP. If there is only one cable modem that is to utilize the transmission opportunities (checked at block 1420), then group polling would become equivalent to unicast polling, and thus, according to block 1425, the CMTS would merely provide unicast data transmission opportunities to the cable modem. If there is more than one cable modem utilizing the transmission opportunities (checked at block 1420), then group polling, in accordance with the invention, would be used.

The MAP for a group polling situation is constructed as follows. Each cable modem has a unique SID, and thus, the tracking variable N will correspond to the SID of the cable modem. The first (and certain subsequent) of the IEs uses N as the SID number (block 1430). Then the IE corresponding to the SID N is completed by mapping the Current Offset to it (block 1440). After the IE for the first/each SID is completed the tracking number N is incremented (block 1450).

In the case of N=2, there should be more cable modems (checked at block 1490) registered and available to use transmission opportunities (since N became 2 after incrementing the N=1 cable modem). If there are more cable modems, a NULL SID, ordinarily a SID of 0 would be used for the next IE (block 1460). This is a "place-holder" IE and does not define an actual cable modem. The offset for the IE with the NULL SID is computed by considering the burst duration of the transmission inherent in the previous IE to the Starting Offset number (block 1470). The IE that is defined by blocks 1460 and 1470 follows the IE for each cable modem in the group. It is needed so that the duration of the burst defined by the IE can be computed.

In group polling, since each cable modem in the group has the same offset, the value Current Offset must now be backed up to become the Starting Offset (block 1480). The IE for the next cable modem is then completed by repeating blocks 1430 and 1440. The blocks 1430 through 1480 keep repeating in this manner until N exceeds the total number of cable modems in the group. The diminution of the offset value from the artificial one created in the previous IE for the place-holder NULL SID puts each cable modem at the same starting offset. In between each cable modem's transmission IE is thus a NULL SID IE which in effect preserves the burst duration in the MAP. The consequence is a doubling of the number of IEs that might need to be defined. Once the IEs and burst duration place-holder IEs for all cable modems have been so mapped, the MAP list is terminated (block 1499) with usually another null SID.

A MAP message exemplifying this process for a single group of two cable modems is given below:

| SID # | IE Type | offset |
|---|---|---|
| SID 1 | 6 | 1 |
| SID 0 | 6 | 2 |
| SID 2 | 6 | 1 |
| SID0 | 6 | 2 |

The above MAP defines two unicast request regions that the cable modems that have the SIDs of 1 and of 2 would use if they have data to transmit. As mentioned above, when the group of cable modems grows, the number of IEs also grow at twice the rate. Thus, the storage requirements of MAPs and IEs may be a constraint upon the number of cable modems that can be in any one group poll.

In traditional DOCSIS, the basic requirement for MAP storage is easily observed as follows. Since the furthest time-frame that can be scheduled is 4096 mini-slots away and the minimum that can be scheduled is 4096 this translates into a worst case scenario of having to store 4096 IEs. For instance, assume that a cable modem had to support 2048 IEs. This number requires storage of at least 9 MAP messages since each MAP can hold 119 cable modem SIDs, as is illustrated by the DOCSIS specification.

Figure 15:
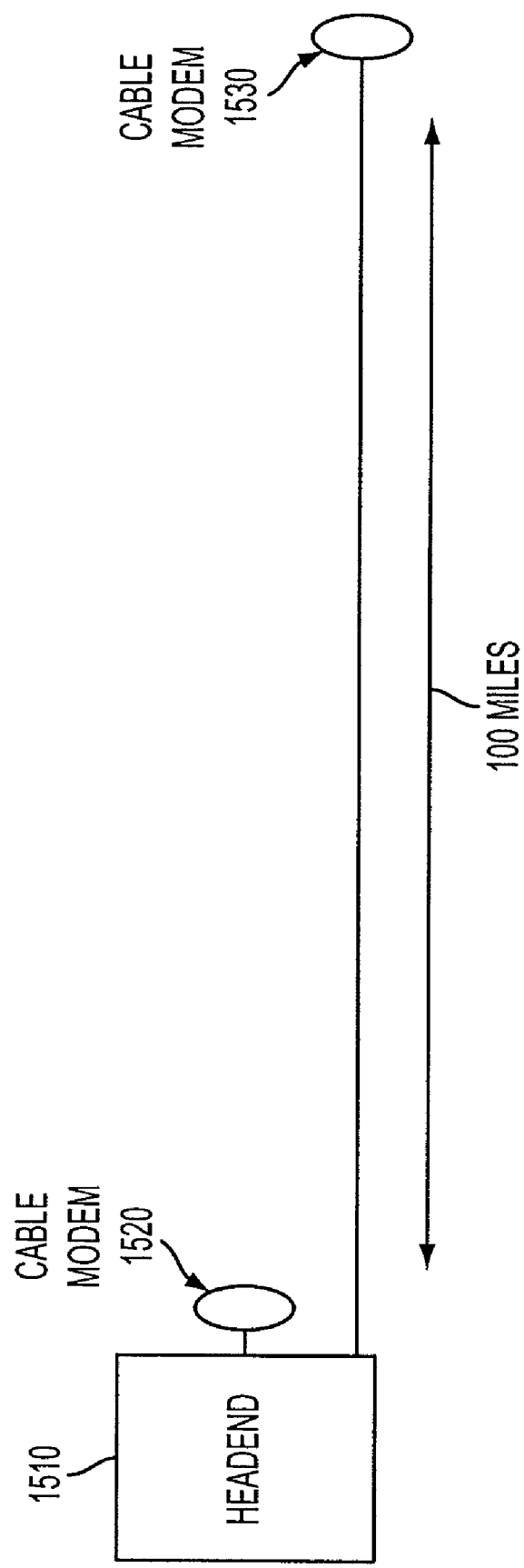
FIG. 15 is an example of propagation delays for cable modems as measured from a headend.

The importance of the number of IEs and MAP messages that can be buffered comes from the fact that the invention's group poll method would consume more IEs than any other conventional IE distribution. The next consideration is the amount of minimum time that buffering must be maintained. In most cases, regardless of the properties and capabilities of the scheduler and related software there would be an uncertainty regarding the placement of a given cable modem. FIG. 15 illustrates the possible scenarios. A cable modem 1520 might be located at the headend 1510 (for example for the purpose of testing) or on the other extreme, another cable modem 1530 might be 100 miles ahead. The downstream propagation of signals for the physical cable portion of the 100 miles between headend 1510 and cable modem 1530 would be 0.8 milliseconds. For a cable modem to process the signal, there is a 200 microsecond MAP advance requirement. Thus, in total the MAP signal should be sent about (800+200 microseconds) 1 millisecond in advance. Since the cable modem needs additional time for upstream signal propagation (0.8 milliseconds) which can be varying for each modem, the total MAP advance might add up to 1.8 milliseconds. The remaining fixed delays such as MAP transmission time, cable modem interleaving delay and upstream packet transmission time does not effect (in a properly designed CMTS) the buffering requirements at the cable modem. Thus, a cable modem would have to keep (worst case of cable modems placed at the $1^{st}$ mile and $100^{th}$ mile) at least 2 milliseconds worth of minislots in its buffer.

A cable modem should at least store two MAP messages—one being processed at the instant and one that will be processed later. The two MAP requirement is only apparent if the CMTS time predicted packet reception time is less than 2 milliseconds farther away from the MAP end time. In cases where the MAP is describing more than two milliseconds away, the Cable Modem would have only one MAP message.

Thus, one possible scheduling constraint upon the CMTS is that the CMTS at any instant should not use more than 2048 IEs to define the current MAP sent out plus the IEs that describe 160 minislots (worst case) earlier than the MAP start time for the MAP.

For example assume that the CMTS is to use group polling for 1000 cable modem NCS Call Signaling SIDs. It is possible to fit 119 SIDs into the polled group. Assuming that there is only one outstanding request that has to be acknowledged, the MAP would be like:

| SID # | IE Type | offset |
|---|---|---|
| SID 1 | 1 | 1 |
| SID 0 | 1 | 2 |
| Above structure repeats 117 times | | |
| SID 119 | 1 | 1 |
| SID 0 | 7 | 2 |
| SID 301 | 6 | 1 |

This puts all of the 119 cable modems in the same poll group, sharing the same offset. Due to the uncertainties in cable modem parsing, it is preferable that not more than one MAP to refer to the same minislot due to cable modem backoff value issues.

The CMTS should be sending the group polls in such a way that the 2 millisecond buffer time and current MAP would consist of not more than 2048 IEs. One way to achieve this is to spread the group polls into a slot of time instead of putting the group poll request mini-slots one after another.

One consequence of using a group poll is that in the event of contention, a cable modem will not backoff and try to utilize the first opportunity. The other important consequence is that even though there is a small probability, it is possible for CMTS not to realize that there was contention in a group poll request area. For this reason the CMTS must at least form two group poll request opportunities and every poll should mix the polled SIDs even though there is no contention detected.

For example, if the group poll is on four SIDs 1, 2, 3, and 4, then for the first poll the MAP would be:

| | MAP #1: | |
|---|---|---|
| SID # | IE Type | offset |
| SID 1 | 6 | 1 |
| SID 0 | 6 | 2 |
| SID 2 | 6 | 1 |
| SID 3 | 6 | 2 |
| SID 0 | 6 | 3 |
| SID 4 | 6 | 2 |
| SID0 | 6 | 3 |

And for the next group poll, the MAP would be:

| SID # | IE Type | offset |
|---|---|---|
| MAP #2: | | |
| SID 1 | 6 | 1 |
| SID 0 | 6 | 2 |
| SID 3 | 6 | 1 |
| SID 2 | 6 | 2 |
| SID 0 | 6 | 3 |
| SID 4 | 6 | 2 |
| SID0 | 6 | 3 |

Using a "rotating bits"-like algorithm it is possible to design a scheme whereby the SIDs will be re-distributed each time decreasing the probability of re-collision. It is also possible that the groups will be used in different MAPs such as:

| SID # | IE Type | offset |
|---|---|---|
| MAP #1: | | |
| SID 1 | 6 | 1 |
| SID 0 | 6 | 2 |
| SID 2 | 6 | 1 |
| SID0 | 6 | 2 |
| MAP #2: | | |
| SID 3 | 6 | 1 |
| SID 0 | 6 | 2 |
| SID 4 | 6 | 1 |
| SID0 | 6 | 2 |

And for the next group polls:

| SID # | IE Type | offset |
|---|---|---|
| MAP #3: | | |
| SID 1 | 6 | 1 |
| SID 0 | 6 | 2 |
| SID 3 | 6 | 1 |
| SID0 | 6 | 2 |
| MAP #4: | | |
| SID 2 | 6 | 1 |
| SID 0 | 6 | 2 |
| SID 4 | 6 | 1 |
| SID0 | 6 | 2 |

Figure 16:
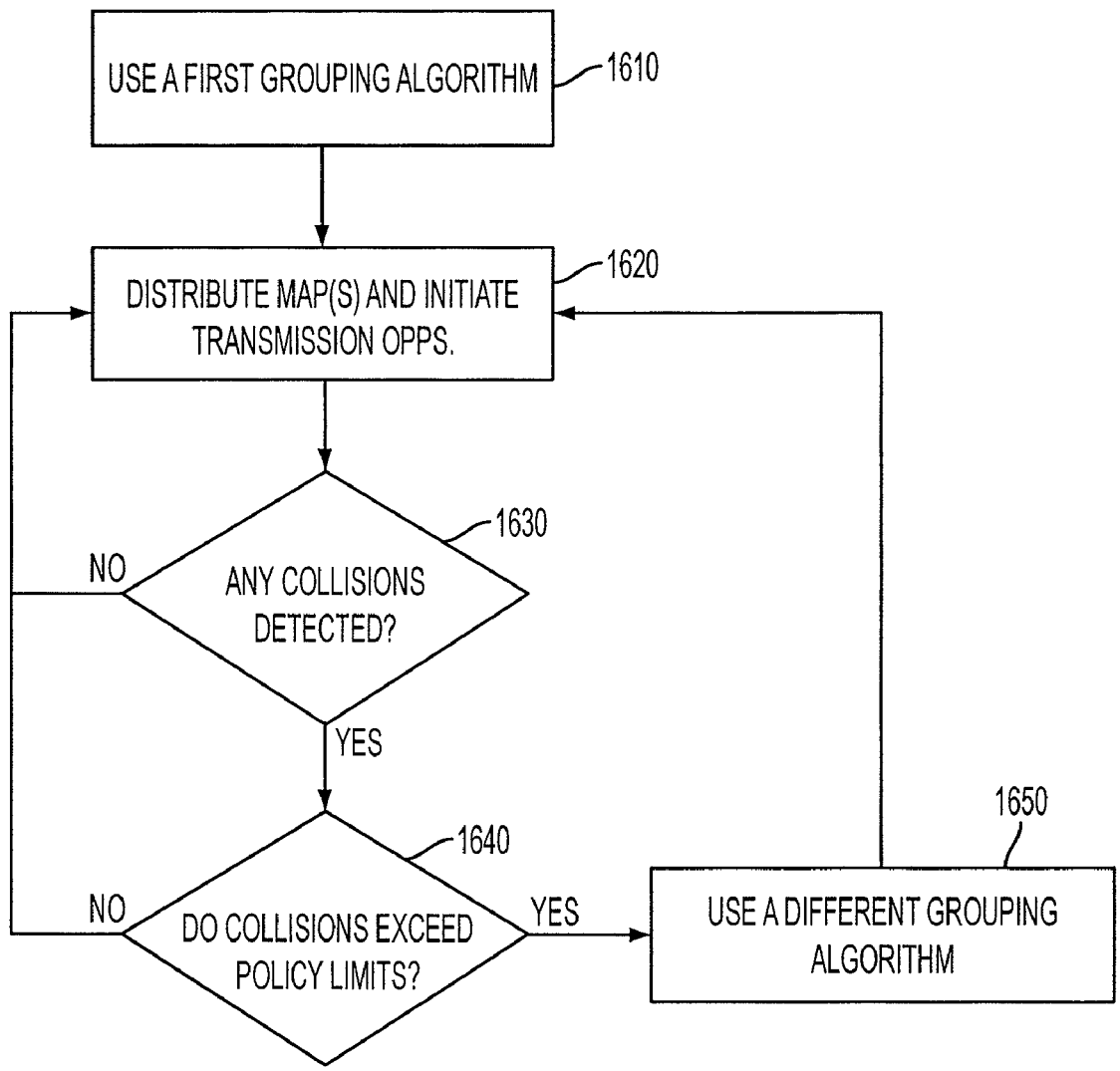
FIG. 16 is a flowchart of dynamic algorithm modification in group polling.

In the event of detected collision depending on the collision handling policy and amount of collision, the CMTS can pick a different algorithm. FIG. 16 illustrates dynamic algorithm modification in such a contention case. A first grouping algorithm such as one placing all cable modems of one group in the same MAP with the same offset (as shown in FIG. 14 and described above) is initially used (block 1610). The MAPs are then distributed to the cable modems and the process of transmission opportunities are initiated (block 1620). During this process, and perhaps after a specified measuring interval, the first query would be if any collisions were detected (checked at block 1630). If not, then the current grouping algorithm could be re-used until conditions create a collision. If there are collisions between cable modems, then the next metric is whether collisions exceed some stated policy limits (checked at block 1640). If not, again, the same grouping algorithm can be re-used. If the collisions exceed policy limits, then a different grouping algorithm would be used (block 1650), and the MAPs distributed again to account for the new ordering. For instance, as a different grouping algorithm, the CMTS could just distribute the SIDs on the contention group poll to a number of new group polls. For example, if there was a four SID group poll and a contention is detected, the CMTS may divide the group in which contention is detected into two and give each a group poll request mini-slot. This is illustrated below.

The MAP wherein the collision detected was:

| SID # | IE Type | offset |
|---|---|---|
| MAP #1: | | |
| SID 1 | 6 | 1 |
| SID 0 | 6 | 2 |
| SID 2 | 6 | 1 |
| SID 0 | 6 | 2 |
| SID 3 | 6 | 1 |
| SID 0 | 6 | 2 |
| SID 4 | 6 | 1 |
| SID0 | 6 | 2 |

The next MAPs would look like:

| SID # | IE Type | offset |
|---|---|---|
| MAP #2: | | |
| SID 1 | 6 | 1 |
| SID 0 | 6 | 2 |
| SID 2 | 6 | 1 |
| SID 3 | 6 | 2 |
| SID 0 | 6 | 3 |
| SID 4 | 6 | 2 |
| SID0 | 6 | 3 |
| or | | |
| MAP #2: | | |
| SID 1 | 6 | 1 |
| SID 0 | 6 | 2 |
| SID 2 | 6 | 1 |
| SID 0 | 6 | 2 |
| MAP #3 | | |
| SID 3 | 6 | 1 |
| SID 0 | 6 | 2 |
| SID 4 | 6 | 1 |
| SID0 | 6 | 2 |

However, if the policy is that the packet should not be delayed, it is possible for CMTS to revert from group polling to individual polling:

| SID # | IE Type | offset |
|---|---|---|
| MAP #1 | | |
| SID 1 | 6 | 1 |
| SID 2 | 6 | 2 |
| SID 3 | 6 | 3 |
| SID 4 | 6 | 4 |
| SID0 | 6 | 5 |

Although the present invention has been described in detail with reference to the disclosed embodiments thereof, those skilled in the art will appreciate that various substitutions and modifications can be made to the examples described herein while remaining within the spirit and scope of the invention as defined in the appended claims. Also, the methodologies described may be implemented using any combination of software, specialized hardware, firmware or a combination thereof and built using ASICs, dedicated processors or other such electronic devices.

What is claimed is:

1. A method comprising:
generating, by a scheduler, implemented at least partially in hardware, a cable modem management message by mapping into the cable modem management message a first pair of information elements, the first pair of information elements including a Service ID (SID) identifying a cable modem and an offset which is a starting offset for transmission opportunities;
mapping, by the scheduler, into the cable modem management message a second pair of information elements, the second pair of information elements including a SID having a null designation and an offset, which is a sum of the starting offset for transmission opportunities and a burst duration of a transmission opportunity identified by the first pair of information elements; and
using, by the scheduler, the cable modem management message to schedule bandwidth for one or more cable modems.

2. A method according to claim 1, further comprising:
defining a group poll definition that defines a plurality of groups of cable modems.

3. A method according to claim 2, where the group poll definition shares a unicast transmission opportunity.

4. A method according to claim 3, where the cable modem management message is terminated after all of the cable modems in the group poll definition have been mapped by the pairs.

5. A method according to claim 2, where the pairs of information elements are mapped for each of the cable modems in the group poll definition, the first information element in each of the pairs having the same starting offset as other first information elements.

6. A method according to claim 3, further comprising:
transmitting the generated cable modem management message to the cable modems in the group poll definition.

7. A device comprising:
a scheduler for scheduling bandwidth over a network, the scheduler to:
define a group poll definition that identifies a plurality of network devices to receive a management message, the management message including a first pair of information elements, the first pair of information elements including a Service ID (SID) identifying a cable modem and an offset which is a starting offset for transmission opportunities, and
map into the management message a second pair of information elements, the second pair of information elements including a Service ID (SID) having a null designation and an offset, which is a sum of a starting offset for transmission opportunities and a burst duration of a transmission opportunity identified by the first pair of information elements.

8. A device according to claim 7, where the network is a broadband communications network.

9. A device according to claim 7, where the network device includes at least one cable modem.

10. A device according to claim 9, where the scheduler is a part of a cable modem termination system.

11. A device according to claim 7, where the scheduler is further to:
point a request opportunity, normally reserved for a single service flow, to more than one service flow.

12. A device according to claim 7, where the scheduler is further to:
use a null SID to define a burst duration.

13. A method comprising:
defining, by a scheduler of a cable modem termination system, a group poll definition that identifies a plurality of cable modems to receive a cable modem management message, the cable modem management message including a first pair of information elements, the first pair of information elements including a Service ID (SID) identifying a cable modem and an offset which is a starting offset for transmission opportunities; and
mapping, by the scheduler, into the cable modem management message a second pair of information elements, the second pair of information elements including a Service ID (SID) having a null designation and an offset, which is a sum of a starting offset for transmission opportunities and a burst duration of a transmission opportunity identified by the first pair of information elements.

14. A method according to claim 13, where the first pair of information elements precede the second pair of information elements in the cable modem management message.

15. A method according to claim 14, where the cable modem management message is terminated after all of the cable modems in the group poll definition have been mapped by the pairs.

16. A method according to claim 14, where the second pair of information elements are included in the cable modem management message to provide bandwidth for the cable modem identified by the another pair of information elements.

17. A method according to claim 13, further comprising:
transmitting the generated cable modem management message to all the cable modems in the group poll definition.

18. A method according to claim 13, further comprising:
defining a plurality of group poll definitions.

19. A method according to claim 18, where each of the plurality of group poll definitions share a unicast transmission opportunity.

* * * * *